United States Patent
Sato et al.

(10) Patent No.: US 7,903,342 B2
(45) Date of Patent: Mar. 8, 2011

(54) LENS ARRAY UNIT AND IMAGE READING DEVICE

(75) Inventors: Shiro Sato, Minato-ku (JP); Kazuto Kase, Minato-ku (JP); Jun Yamaguchi, Minato-ku (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 12 days.

(21) Appl. No.: 12/511,575

(22) Filed: Jul. 29, 2009

(65) Prior Publication Data
US 2010/0027129 A1    Feb. 4, 2010

Related U.S. Application Data

(60) Provisional application No. 61/084,784, filed on Jul. 30, 2008.

(51) Int. Cl.
*G02B 27/10* (2006.01)
*G03B 21/60* (2006.01)
*G03B 21/56* (2006.01)

(52) U.S. Cl. .......................... 359/622; 359/443; 359/454

(58) Field of Classification Search .......... 359/618–622, 359/625–626, 443, 454–455; 264/1.1, 1.32, 264/2.7
See application file for complete search history.

(56) References Cited

U.S. PATENT DOCUMENTS 6,999,159 B2 *   2/2006  Hase .............................. 355/53
2001/0028506 A1 * 10/2001  Fujimoto et al. .............. 359/622

FOREIGN PATENT DOCUMENTS

JP           2005-352429 A    12/2005

* cited by examiner

*Primary Examiner* — Scott J Sugarman
*Assistant Examiner* — Dawayne A Pinkney
(74) *Attorney, Agent, or Firm* — Sughrue Mion, PLLC

(57) ABSTRACT

A lens array unit includes a first lens array plate, a second lens array plate, and a holder. The holder includes a first surface part provided with a plurality of first through holes respectively corresponding to a plurality of first outer lenses, a second surface part provided with a plurality of second through holes respectively corresponding to a plurality of second outer lenses, and a support part operative to support the first surface part and the second surface part so as to be located at a predetermined distance from each other. The first surface part, the second surface part, and the support part are integrally formed by a light shielding material, and the first lens array plate and the second lens array plate are held by the holder by being inserted into the gap between the first surface part and the third surface part and the gap between the second surface part and the third surface part, respectively.

17 Claims, 20 Drawing Sheets

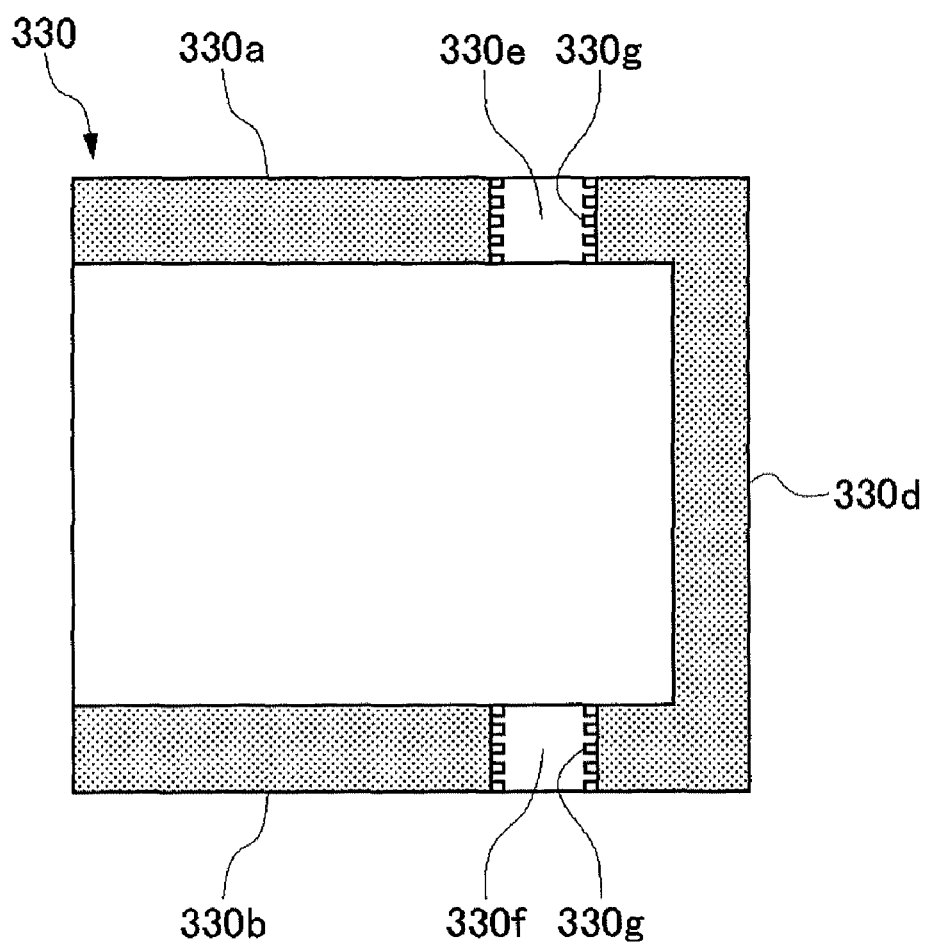

LENS ARRAY UNIT AND IMAGE READING DEVICE

This Application claims priority from U.S. Provisional Application No. 61/084,784, filed Jul. 30, 2008 the disclosure of which is incorporated herein by reference.

BACKGROUND OF THE INVENTION

1. Field of the Invention

The present invention relates to a lens array unit and an image reading device using the lens array unit.

2. Description of the Related Art

Some image reading devices such as scanners and image forming devices such as LED printers are known to use erecting equal-magnification optical systems. Erecting equal-magnification optical systems are capable of reducing the size of devices better than reduction optical systems. In the case of image reading devices, an erecting equal-magnification optical system comprises a line light source, an erecting equal-magnification lens array, and a line image sensor. In the case of image forming devices, an erecting equal-magnification optical system comprises a line light source, an erecting equal-magnification lens array, and a photosensitive drum.

A rod lens array capable of forming an erect equal-magnification image is conventionally used as an erecting equal-magnification lens array in an erecting equal-magnification optical system. Recently, there is proposed a lens array unit formed as a stack of a plurality of transparent lens array plates built such that the optical axes of individual convex lenses are aligned, where each transparent lens array plate includes a systematic arrangement of micro-convex lenses on both surfaces of the plate. Since a lens array unit such as this comprises a stack of lens array plates formed by, for example, injection molding, an erecting equal-magnification lens arrays can be manufactured at a relatively low cost.

A lens array unit lacks a wall for beam separation between adjacent lenses. Therefore, there is a problem of stray light wherein a light beam diagonally incident on the lens array unit travels diagonally inside the plate and enters an adjacent convex lens, creating a ghost image as it leaves the plate.

Patent document No. 1 discloses a technology to address stray light whereby the first lens array facing an object on which an image is formed is fitted with a light shielding member for regulating light traveling from the object.

[patent document No. 1] JP 2005-352429

In the lens array unit described in patent document No. 1, the shielding member is fitted to the first lens array such that the plurality of through holes formed in the shielding member are directly aligned with the front surfaces of the corresponding lenses formed in the first lens array by allowing a projection provided in the first lens array to fit a recess provided in the shielding member When an assembly of the first lens array and the shielding member is formed by fitting a projection to a recess as in patent document 1, certain allowance in the diameter is required for fitting. This may create displacement between the optical axis of the lens of the first lens array and the optical axis of the through hole of the shielding member and poorer imaging performance.

SUMMARY OF THE INVENTION

The present invention addresses the aforementioned disadvantage and a purpose thereof is to provide a lens array unit capable of improving imaging performance by increasing the precision in aligning the shielding member with the lens array plate.

A lens array unit addressing the purpose comprises: a first lens array plate provided with a plurality of first outer lenses arranged systematically on one of the surfaces of the plate and with a plurality of first inner lenses arranged systematically on the other surface; a second lens array plate provided with a plurality of second outer lenses arranged systematically on one of the surfaces of the plate and with a plurality of second inner lenses arranged systematically on the other surface; and a holder operative to hold a stack of the first lens array plate and the second lens array plate such that the first inner lenses and the second inner lenses are respectively opposite to each other, wherein the holder comprises: a first surface part provided with a plurality of first through holes respectively corresponding to the plurality of first outer lenses; a second surface part provided with a plurality of second through holes respectively corresponding to the plurality of second outer lenses; and a support part operative to support the first surface part and the second surface part so as to be located at a predetermined distance from each other, wherein the first surface part, the second surface part, and the support part are integrally formed by a light shielding material, and the first lens array plate and the second lens array plate are held by the holder by being inserted between the first surface part and the second surface part such that each of the plurality of first outer lenses is located opposite to the corresponding first through hole, and each of the plurality of second outer lenses is located opposite to the corresponding second through hole.

According to this embodiment, since the first surface part, the second surface part, and the support part of the holder are integrally formed, the first through hole and the second through hole are formed at predetermined positions with high precision. Since the first outer lenses and the second outer lenses are located opposite to the first through holes and the second through holes thus formed with high precision, respectively, the precision of positioning the lenses and the through holes is improved. As a result, the imaging performance is improved.

Further, according to this embodiment, the first surface part and the second surface part of the holder can function as a light shielding member for shielding light not contributing to imaging. Since there is no need to provide a light shielding member apart from the holder, the number of components is reduced, making the lens array unit inexpensive.

A third surface part, formed by a light shielding material and formed with a plurality of third through holes respectively corresponding to the first inner lenses and the second inner lenses, may be provided between the first lens array plate and the second lens array plate. The third surface part may be formed to be integral with the first surface part, the second surface part, and the support part. In this case, light not contributing to imaging is further shielded.

The support part may support the first surface part and the second surface part at one of the ends of each in the lateral direction, and the first and second lens array plates may be held by the holder by being inserted into the space between the first surface part and the second surface part from the other, open end in the lateral direction. The through holes of the first surface part and the second surface part may be provided more toward the open end than the center in the lateral direction. In this case, insertion of the first and second lens array plates is facilitated so that the number of steps assembly is reduced.

The holder may be provided, at the open end in the lateral direction, with a light shielding plate for shielding light entering from the open end. In this case, light not contributing to imaging is further preventing from entering via the open lateral end.

The first and second lens array plates may be secured to the holder by a securing pin member extending from the first surface part through the second surface part. The pin member may have a pin head projecting from the first surface part by a predetermined height. By providing the pin head, contact of the main body of the lens array unit with the glass plate, on which the document G is placed, is prevented from occurring when the lens array unit is built into the image reading device.

The first and second lens array plates may be secured to the holder by an engagement structure. The engagement structure facilitates the step of fitting the first and second lens array plates to the holder so that the number of steps of assembly is reduced.

The lens array unit may further comprise a positioning pin member extending from the first surface part through the second surface part, wherein the positioning pin member is operative to secure the relative position of the first and second lens array plates, and the first and second surface parts. In this case, the precision of positioning the lenses and the through holes is improved.

The first and/or second array plate may have a tapered portion at the leading end inserted into the space between the first surface part and the second surface part. In this case, the insertion of the first and/or second lens array plate is facilitated so that the number of steps of assembly is reduced.

The other surface of the first lens array plate and the other surface of the second lens array plate may be provided with a provisional positioning part comprising a recess and a projection for convex-concave engagement. In this case, the first lens array plate and the second lens array plate can be provisionally positioned before inserting the plates into the space between the first surface part and the second surface part. Accordingly, assembly is facilitated and the number of steps for assembly is reduced.

The first and second lens array plates may be each formed with a positioning pin member insertion hole in which is inserted a positioning pin member for securing the relative position of the first and second lens array plates, and the first and second surface parts, and/or with a securing pin member insertion hole in which is inserted a securing pin member for securing the first and second lens array plates to the holder, and wherein the recess and the projection may be formed around the positioning pin member insertion hole and/or the securing pin member insertion hole. By forming the recess and the projection around the positioning pin member insertion hole and/or the securing pin member insertion hole, the precision of positioning the lenses and the through holes is improved.

The holder may have a lateral wall surface part at both ends thereof in the longitudinal direction, and a slit for extending the space between the first surface part and the second surface part may be provided in the lateral wall surface part. In this case, insertion of the first and second lens array plates is facilitated so that the ease of assembly is improved.

Irregularities may be formed on the inner surface of the first through hole and/or the second through hole. In this case, light incident on the inner surface of the first through hole and/or the second through hole is scattered by the irregularities so that the light reflected by the inner surface of the first through hole and/or the second through hole is prevented from turning into stray light.

The first through hole and/or the second through hole may be formed as tapered hole. In this case, the light reflected by the inner surface of the first through hole and/or the second through hole is prevented from turning into stray light.

Another embodiment of the present invention relates to an image reading device. The device comprises: a line irradiator device for irradiating a document; the lens array unit for condensing light reflected from the document after exiting the line irradiator device; and a line image sensor for receiving the light condensed by the lens array unit.

According to this embodiment, by using a lens array unit whereby the precision of positioning the lens and the through hole corresponding to each other is improved and light not contributing to imaging is suitably eliminated, the image of the document is properly formed on the line image sensor. By using an inexpensive lens array unit, the cost of the image reading device is reduced.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 25 shows a variation of the holder.

DETAILED DESCRIPTION OF THE INVENTION

Figure 1:
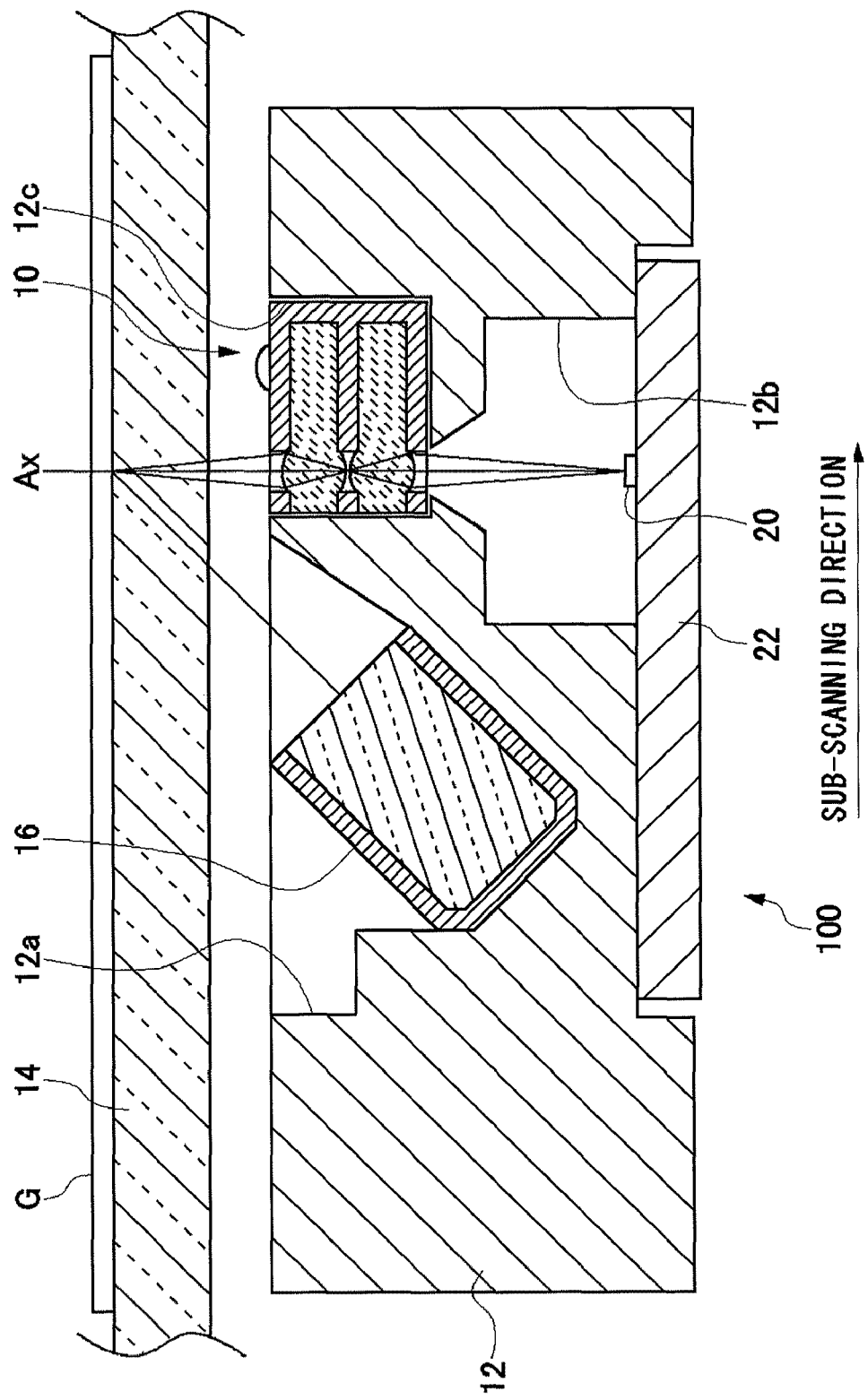
FIG. 1 is a sectional view of an image reading device using a lens array unit according to an embodiment of the present invention.

The invention will now be described by reference to the preferred embodiments. This does not intend to limit the scope of the present invention, but to exemplify the invention. FIG. 1 is a sectional view of an image reading device 100 using a lens array unit 10 according to an embodiment of the present invention. As shown in FIG. 1, the image reading device 100 comprises a frame (housing) 12, a glass plate 14 on which a document G is placed, a line irradiator device 16 for irradiating the document G, a lens array unit 10 for condensing light reflected from the document G, and a line image sensor (photoelectric device) 20 for receiving the light condensed by the lens array unit 10.

A recess 12a is formed toward the top of the frame 12 and a recess 12b is formed toward the bottom thereof. The line irradiator device 16 is diagonally secured in the top recess 12a. The line irradiator 16 is secured such that the optical axis of the irradiating light passes an intersection between the optical axis Ax of the lens array unit 10 and the top surface of the glass plate 14. The top surface of the recess 12a is covered by the glass plate 14. A base plate 22 provided with the line image sensor 20 is fitted to the bottom recess 12b. Further, a recess 12c is formed above the recess 12b of the frame 12. The lens array unit 10 is secured in the recess 12c using a securing member (not shown).

The lens array unit 10 comprises a stack of a plurality of (two, in the case of this embodiment) lens array plates such that pairs of corresponding lenses form a coaxial lens system, where each lens array plate is formed with a plurality of lenses on both surfaces of the plate. The lens array plate 10 receives substantially straight light reflected from the document G located above and form an erect equal-magnification image on an image plane located below, i.e., a light-receiving surface of the line image sensor 20. The lens array unit 10 is fitted to the image reading device 100 such that the longitudinal direction of the lens array unit 10 is aligned with the main scanning direction and the lateral direction is aligned with the sub-scanning direction. Details of the lens array unit 10 will be described later.

In the image reading device 100, the light exiting the line irradiator device 16 irradiates the document G through the glass plate 14. The document G is read by allowing the line image sensor 20 to detect the light reflected from the document G via the lens array unit 10. A desired area on the document G is read by scanning the frame 12 in the sub-scanning direction with respect to the glass plate 14.

Figure 2:
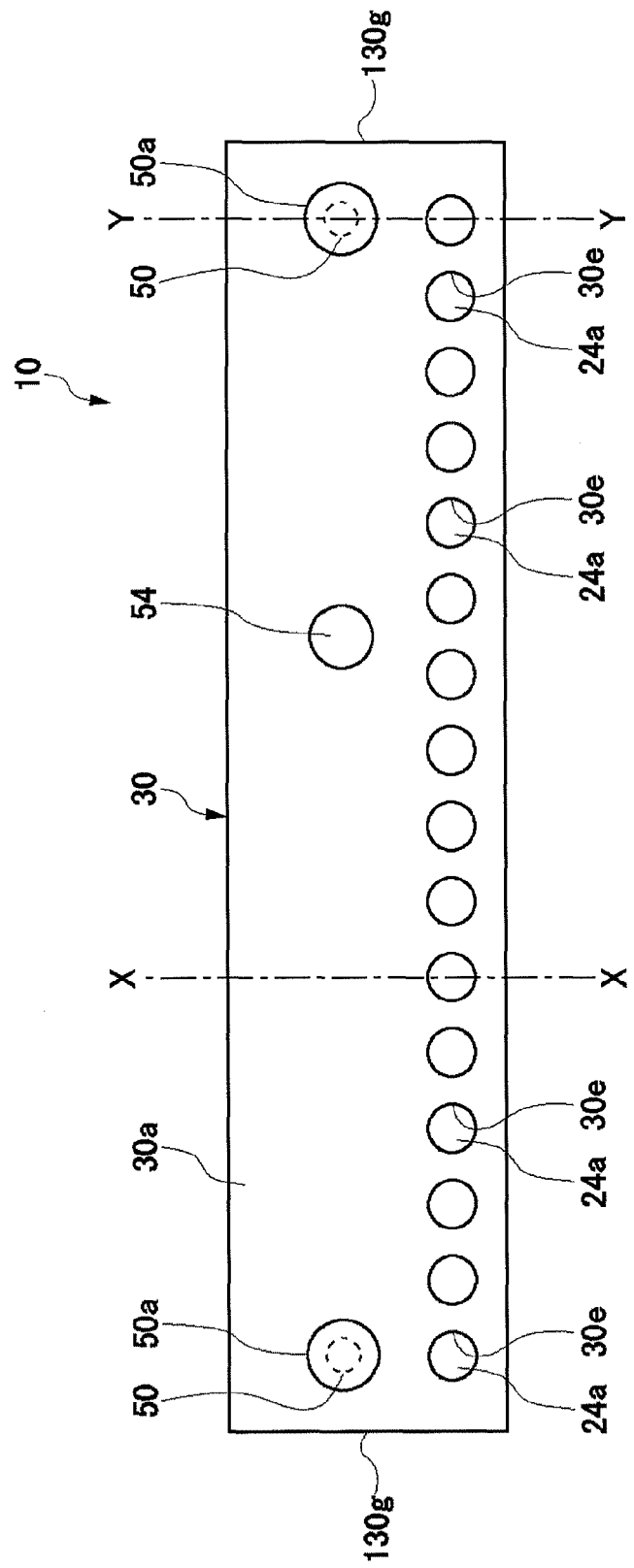
FIG. 2 is a top view of the lens array unit according to the embodiment.
Figure 3:
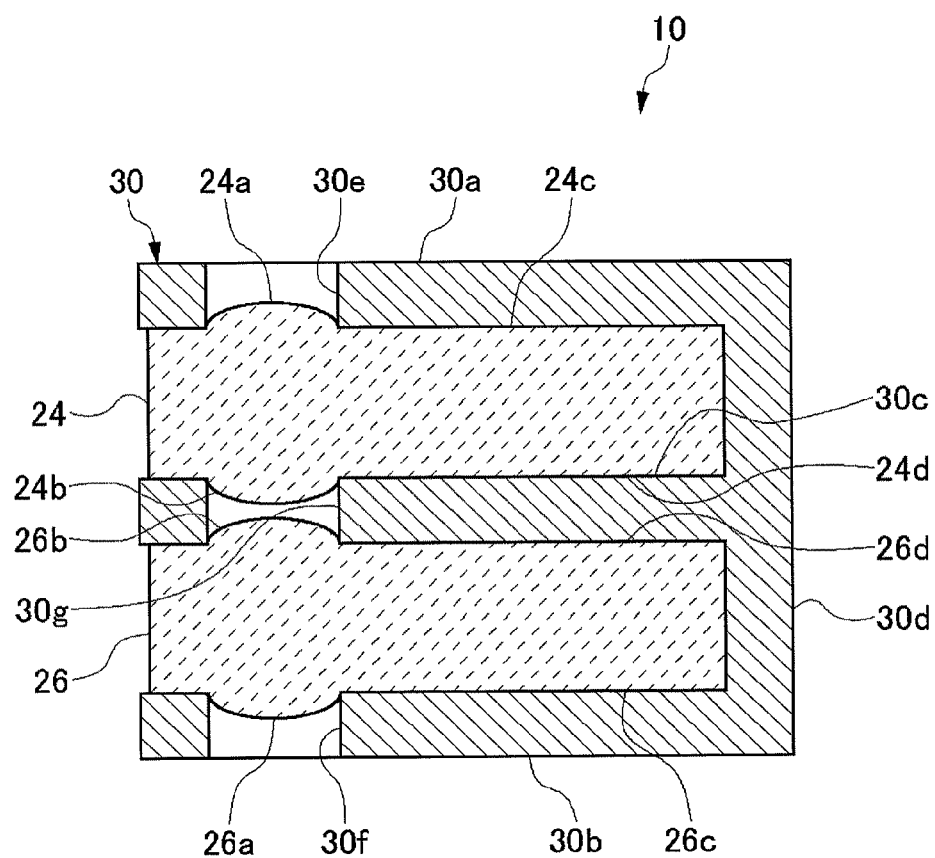
FIG. 3 is an X-X sectional view of the lens array unit shown in FIG. 2.
Figure 4:
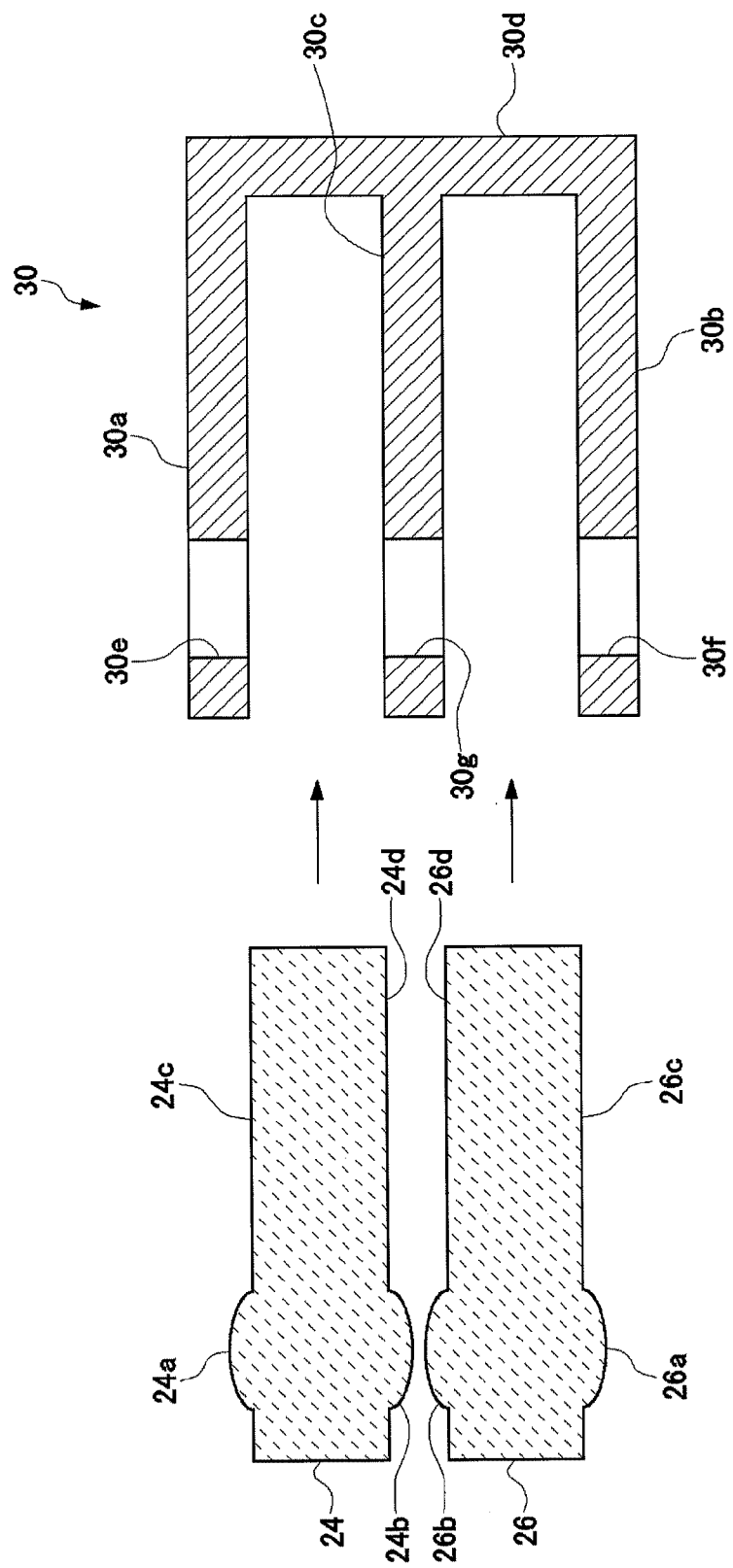
FIG. 4 is an exploded view of the lens array unit.

FIG. 2 is a top view of the lens array unit 10 according to the embodiment. FIG. 2 shows the lens array unit 10 as viewed from the document G. FIG. 3 is an X-X sectional view of the lens array unit shown in FIG. 2. FIG. 4 is an exploded view of the lens array unit 10.

As shown in FIGS. 2-4, the lens array plate 10 is provided with a first lens array plate 24, a second lens array plate 26, and a holder 30.

According to the embodiment, the first lens array plate 24 and the second lens array plate 26 have the same shape. The first lens array plate 24 and the second lens array plate 26 are rectangular in shape. A plurality of convex lenses are arranged on both surfaces of the plate. In other words, a plurality of first outer lenses 24a are systematically arranged on a first outer side surface 24c of the first lens array plate 24, and a plurality of first inner lenses 24b are systematically arranged on a first inner side surface 24d. A plurality of second outer lenses 26a are systematically arranged on a second outer side surface 26c of the second lens array plate 26, and a plurality of second inner lenses 26b are systematically arranged on a second inner side surface 26d.

According to the embodiment, the first outer lens 24a, the first inner lens 24b, the second outer lens 26a, and the second inner lens 26b have the same shape. The lenses are arranged in a line at the same pitch in the longitudinal direction of the lens array plate. Thus, when the first lens array plate 24 and the second lens array plate 26 are placed such that the first inner lenses 24b and the second inner lenses 26 are opposite to each other, the optical axes of the corresponding four lenses are aligned. According to the embodiment, it is assumed that the first outer lens 24a, the first inner lens 24b, the second outer lens 26a, and the second inner lens 26b are spherical in shape. Alternatively, the lenses may have aspherical shapes.

The first lens array plate 24 and the second lens array plate 26 are formed by injection molding. Preferably, each of the first lens array plate 24 and the second lens array plate 26 is formed of a material amenable to injection molding, having high light transmittance in a required wavelength range, and having low water absorption. Desired materials include cycloolefin resins, olefin resins, norbornene resins, and polycarbonate.

The holder 30 supports a stack of the first lens array plate 24 and the second lens array plate 26 such that the first inner lenses 24b and the second inner lenses 26b are opposite to each other. As shown in FIGS. 2-4, the holder 30 is provided with a first surface part 30a, a second surface part 30b, a third surface part 30c, and a support part 30d.

The first surface part 30a, the second surface part 30b, and the third surface part 30c are rectangular plate members having substantially the same size. The first surface part 30a and the second surface part 30b are supported by the support 30d provided at the right end of the surface parts in the lateral direction such that the surface parts are parallel and create a predetermined space therebetween. The third surface part 30c is provided between the first surface part 30a and the second surface part 30b and parallel with the first surface part 30a and the second surface part 30b. The right end of the third surface part 30c is connected to the support part 30d. In the holder 30, the space between the first surface part 30a and the third surface part 30c and the space between the second surface part 30b and the third surface part 30c are each ensured to be equal to or slightly larger than the thickness of the first lens array plate 24 and the second lens array plate 26 so that the first lens array plate 24 and the second lens array plate 26 can be inserted into the space.

A plurality of first through holes 30e corresponding to the plurality of first outer lenses 24a of the first lens array plate 24 are formed in the first surface part 30a. A plurality of second through holes 30f corresponding to the plurality of second outer lenses 26a of the second lens array plate 26 are formed in the second surface part 30b. A plurality of third through holes 30g corresponding to the plurality of first inner lenses 24b of the first lens array plate 24 and the second inner lenses 26b of the second lens array plate 26 are formed in the third surface part 30c. The first through holes 30e, the second through holes 30f, and the third through holes 30g are cylindrical in shape.

According to the embodiment, the first through holes 30e, the second through holes 30f, and the third through holes 30g have the same shape and are arranged in a line at the same pitch in the longitudinal direction of the first surface part 30a, the second surface part 30b, and the third surface part 30c, respectively. The central axes of the corresponding three through holes are aligned. The diameter of each of the first through holes 30e, the second through holes 30f, and the third through holes 30g is substantially the same as the diameter of the effective region of each of the first outer lenses 24a, the first inner lenses 24b, the second outer lenses 26a, and the second inner lenses 26b. The term "effective region of a lens" refers to a portion having the function of a lens. The pitch of arrangement of the first through holes 30e, the second through holes 30f, the third through holes 30g is identical to the pitch of arrangement of the first outer lenses 24a, the first inner lenses 24b, the second outer lenses 26a, and the second inner lenses 26b.

The first surface part 30a, the second surface part 30b, the third surface part 30c, and the support part 30d are integrally formed by a light shielding material. The assembly may be formed by, for example, injection molding. Preferably, the shielding material is amenable to injection molding and is highly capable of shielding light in a required wavelength band. For example, the shielding material may be an ABS resin.

According to the embodiment, the first lens array plate 24 is held by the holder 30 by being inserted into the space between the first surface part 30a and the third surface part 30c from the open left end in the lateral direction. The second lens array plate 26 is held by the holder 30 by being inserted into the space between the second surface part 30b and the third surface part 30c from the open left end in the lateral direction. When inserting the first lens array plate 24 or the second lens array plate 26 into the holder, the lateral open ends of the first surface part 30a, the second surface part 30b, and the third surface part 30c are extended. The ends are then closed after the plates are inserted. This prevents the lens array plate according to the embodiment formed with convex lenses from being damaged in the process of insertion.

In a state where the first lens array plate 24 is inserted into a space between the first surface part 30a and the third surface part 30c, the plurality of first outer lenses 24a are set in the respective first through holes 30e of the first surface part 30a. The plurality of first inner lenses 24b are set in the respective third through holes 30g of the third surface part 30c. Further, in a state where the second lens array plate 26 is inserted into a space between the second surface part 30b and the third surface part 30c, the plurality of second outer lenses 26a are set in the respective second through holes 30f of the second surface part 30b. The plurality of second inner lenses 26b are set in the respective third through holes 30g of the third surface part 30c.

By producing the assembly as described above, the area on the first outer side surface 24c of the first lens array plate 24 outside the effective region of the first outer lenses 24a is covered by the first surface part 30a, and the area on the first inner side surface 24d outside the effective region of the first inner lenses 24b is covered by the third surface part 30c. Further, the area on the second outer side surface 26c of the second lens array plate 26 outside the effective region of the second outer lenses 26a is covered by the second surface part 30b, and the area on the second inner side surface 26d outside the effective region of the second inner lenses 26b is covered by the third surface part 30c.

As described above, the first surface part 30a, the second surface part 30b, and the third surface part 30c are formed of a light shielding material. Therefore, the first surface part 30a functions as a light shielding member for preventing light not contributing to imaging (hereinafter, referred to as stray light) from being incident on the first outer lenses 24a. The third surface part 30c functions as a light shielding member for preventing stray light from exiting the first inner lenses 24b and preventing stray light from being incident on the second inner lenses 26b. The second surface part 30b functions as a light shielding member for preventing stray light from exiting the second outer lenses 26a.

Thus, in the lens array unit 10 according to the embodiment, the holder 30 for holding the first lens array plate 24 and the second lens array plate 26 functions as a light shielding member for eliminating stray light entering the lenses formed in the first lens array plate 24 and the second lens array plate 26. Since the holder 30 functions as a light shielding member, the number of components is reduced, making the lens array unit 10 inexpensive.

Since the first surface part 30a, the second surface part 30b, the third surface part 30c, and the support part 30d are formed as one piece according to the embodiment, the first through holes 30e, the second through holes 30f, and the third through holes 30g are formed at predetermined positions with high precision. Since the lenses are set in the first through holes 30e, the second through holes 30f, and the third through holes 30g formed with high precision, the precision of alignment of the lenses and the through holes is improved so that the imaging performance is consequently improved.

According to the embodiment, the first lens array plate 24 and the second lens array plate 26 are inserted from the open end of the holder 30 in the lateral direction. This ensures that the first lens array plate 24 and the second lens array plate 26 need to be pressed a relatively short distance, thereby facilitating the assembly.

According to the embodiment, one end of the holder 30 is open. Therefore, the lenses can be brought close to the line irradiator device 16 when the lens array unit 10 is built in the image reading device 100. Preferably, as shown in FIGS. 2-4, the first through holes 30e, the second through holes 30f, and the third through holes 30g are provided more toward the open end of the first surface part 30a, the second surface part 30b, the third surface part 30c than the center in the lateral direction. By providing the through holes more toward the open end than the center in the lateral direction, the distance in which the lenses have to be pressed is reduced. Accordingly, the likelihood of causing damage due to abrasion between the lenses and the surface parts is reduced or eliminated.

Figure 5:
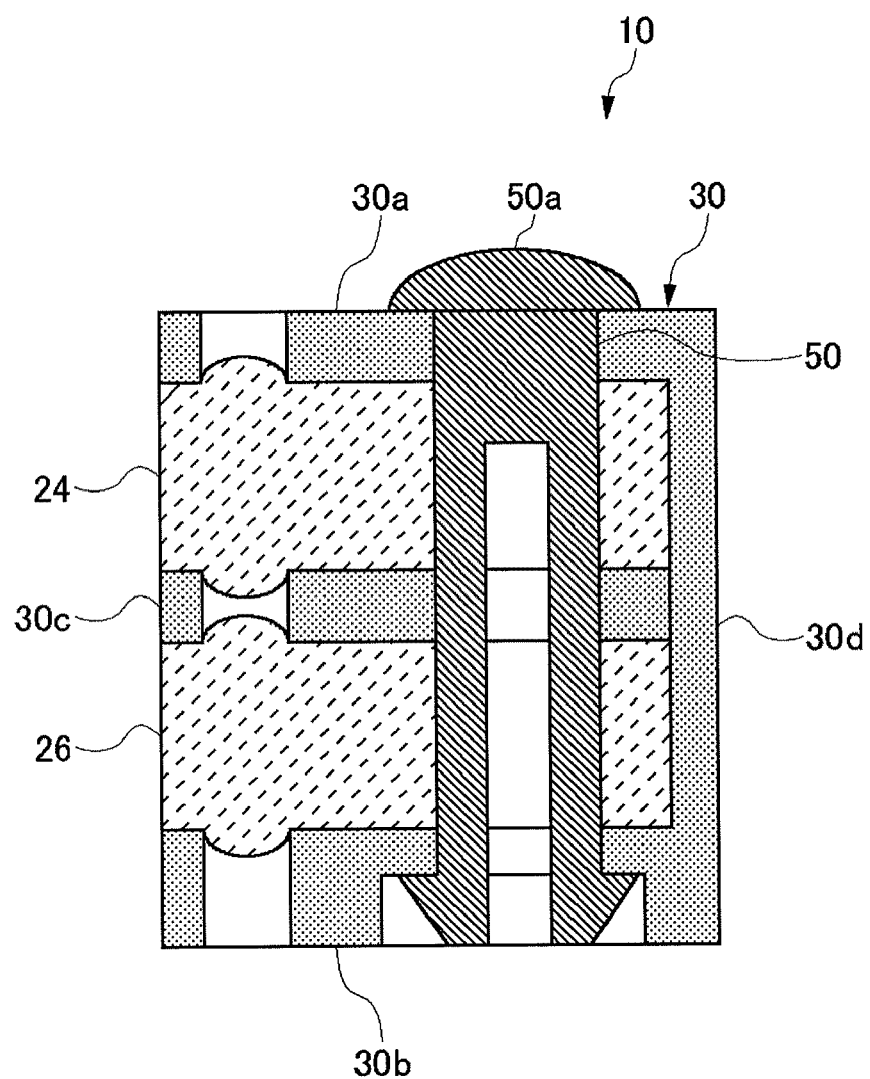
FIG. 5 shows a method of securing the lens array plate.

FIG. 5 shows a method of securing the lens array plate. FIG. 5 is a Y-Y sectional view of the lens array unit 10 shown in FIG. 2. According to the embodiment, the first lens array plate 24 and the second lens array plate 26 are secured to the holder 30 by a caulking pin 50, which is a securing pin member extending from the first surface part 30a through the second surface part 30b. The caulking pin 50 is provided at both longitudinal ends of the lens array unit 10.

As shown in FIG. 5, the caulking pin 50 has a pin head 50a projecting from the first surface part 30a by a predetermined height. By providing the pin head 50a, contact of the main body of the lens array unit with the glass plate 14, on which the document G is placed, is prevented from occurring when the lens array unit 10 is built into the image reading device 100 shown in FIG. 1. The height of the pin head 50a may be appropriately determined by allowing for the distance between the lens array unit 10 and the glass plate 14 occurring when the lens array unit 10 is built into the image reading device 100.

Figure 6:
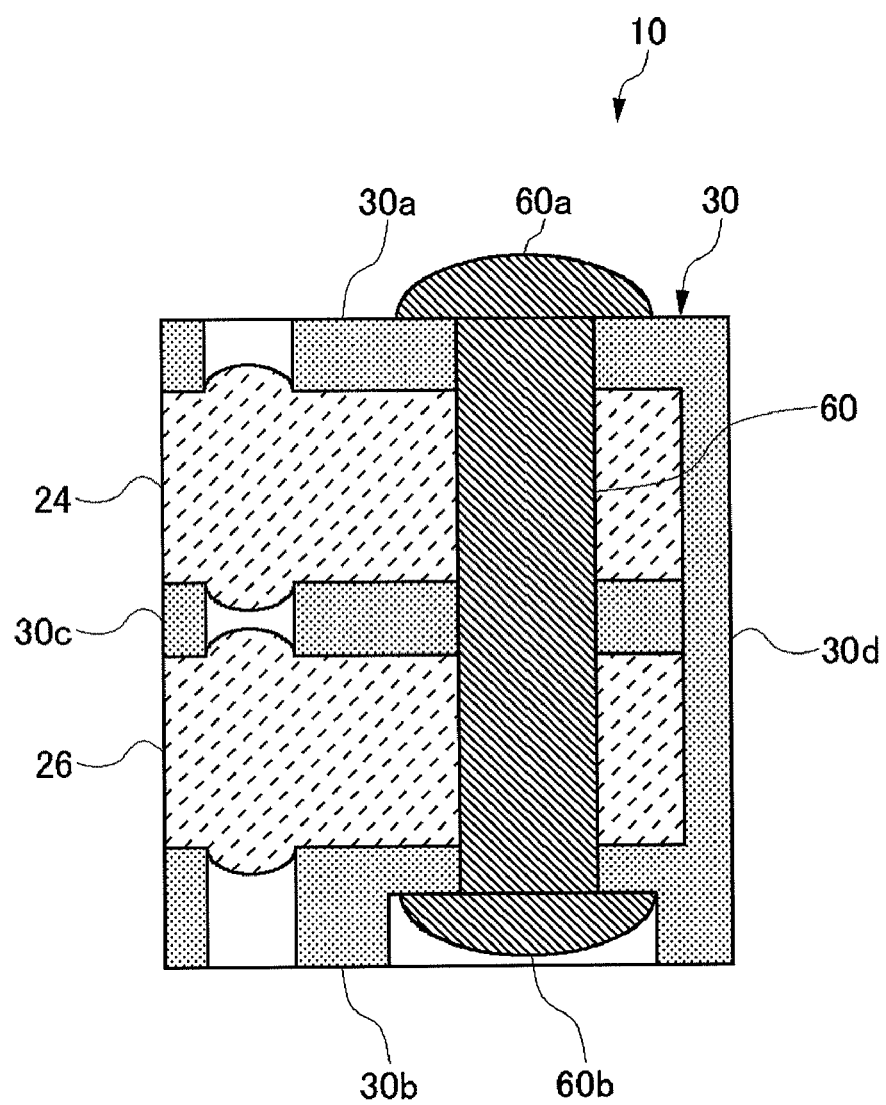
FIG. 6 shows another method of securing the lens array plate.

FIG. 6 shows still another method of securing the lens array plate. In the embodiment shown in FIG. 6, a securing pin 60 having a pin head 60a at one end is made to extend from the first surface part 30a through the second surface part 30b. The pin is secured by heating and melting the other end 60b at the second surface 30b and by turning the end 60b into a weld ball.

Figure 7A:
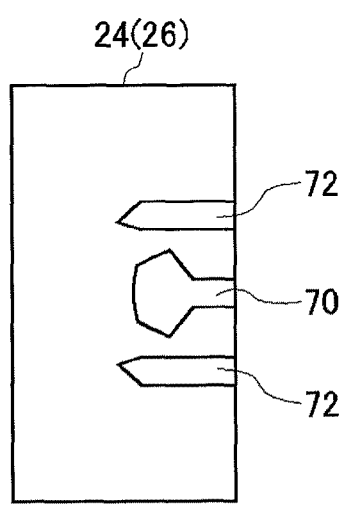
FIGS. 7A and 7B show another method of securing the lens array plate.
Figure 7B:
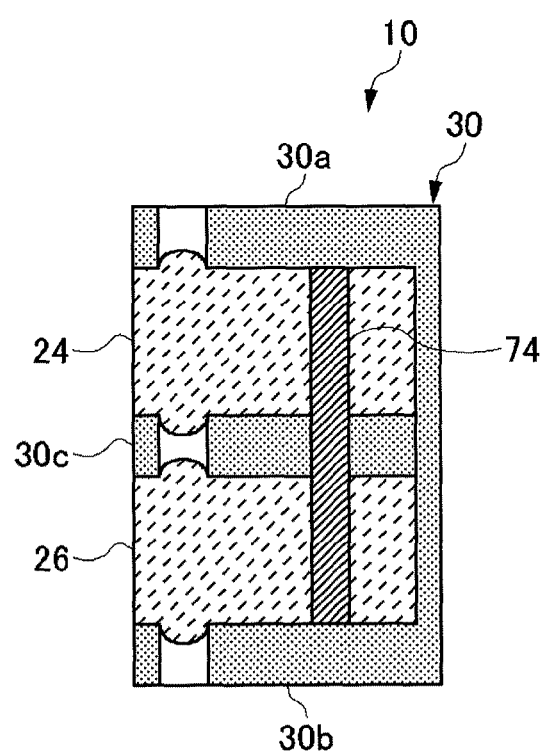

FIGS. 7A and 7B show yet another method of securing the lens array plate. FIG. 7A is a top view showing a portion in the vicinity of an engagement hole 70 in the first lens array plate 24 and the second lens array plate 26. FIG. 7B is a sectional view of the lens array unit 10. By engaging an engagement pin 74 extending from the first surface part 30a through the second surface part 30b with the engagement hole 70 of the first lens array plate 24 and the second lens array plate 26, the first lens array plate 24 and the second lens array plate 26 are secured to the holder 30. A groove 72 provided on both sides of the engagement hole 70 are for allowing the entrance of the engagement hole 70 to be extended when the engagement pin 74 is set in the engagement hole 70. The first lens array plate 24 and the second lens array plate 26 may be secured to the holder 30 using such an engagement structure.

Figure 8:
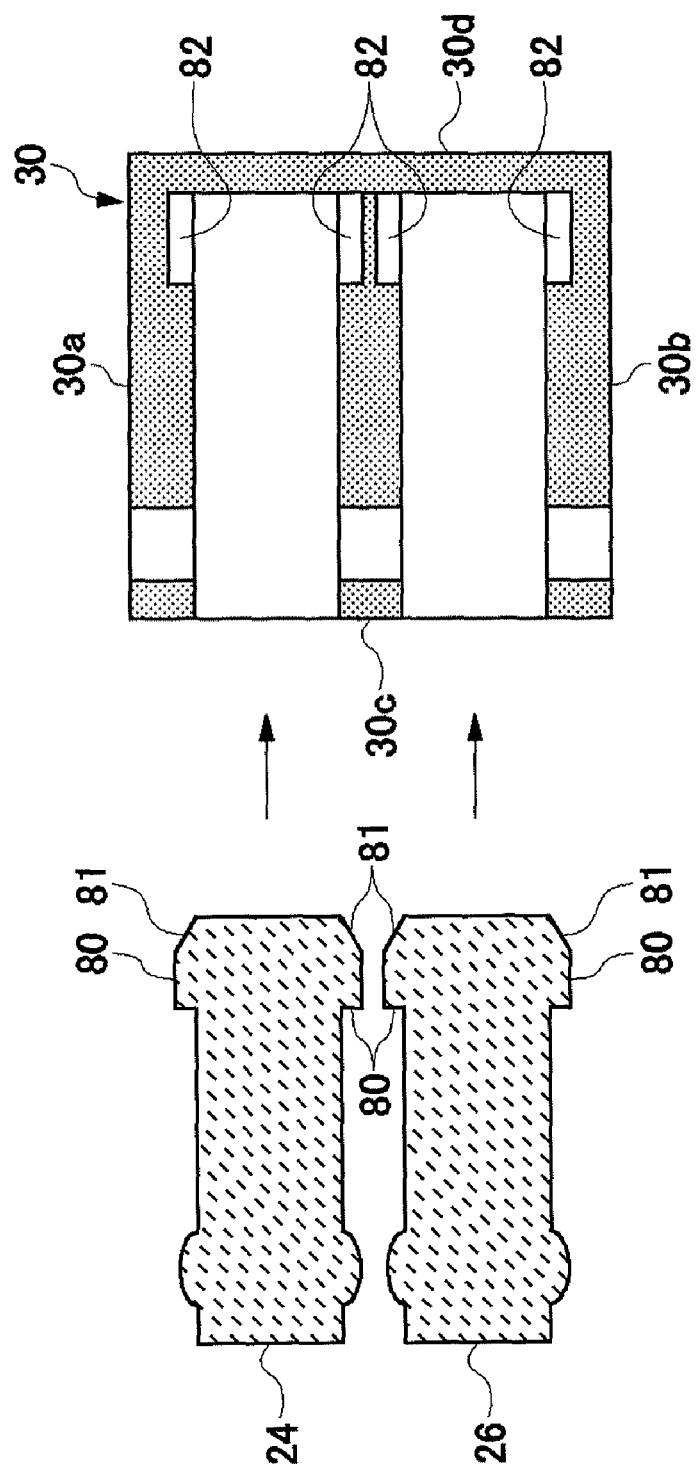
FIG. 8 shows another method of securing the lens array plate.

FIG. 8 shows yet another method of securing the lens array plate. The first lens array plate 24 and the second lens array plate 26 according to the embodiment shown in FIG. 8 are also secured to the holder 30 using an engagement structure. According to the embodiment shown in FIG. 8, a projection 80 is formed at one end of the first lens array plate 24 and the second lens array plate 26 in the lateral direction. The projection 80 is formed on both surfaces of each of the first lens array plate 24 and the second lens array plate 26. The projection 80 has a tapered portion 81 at the leading end inserted into the holder 30. Recesses 82 with which the projections of the first lens plate 24 and the second lens array plate 26 are engaged are formed in the first surface part 30*a*, the second surface part 30*b*, and the third surface part 30*c* of the holder 30.

Due to the tapered portion 81 of the projection 80, the open lateral ends of the first surface part 30*a*, the second surface part 30*b*, and the third surface part 30*c* are extended simply by pressing the first lens array plate 24 and the second lens array plate 26. Therefore, the first lens array plate 24 and the second lens array plate 26 can be easily inserted into the holder. By allowing the open lateral ends of the first surface part 30*a*, the second surface part 30*b*, and the third surface part 30*c* to be extended, the lenses are prevented from being damaged. When the first lens array plate 24 and the second lens array plate 26 are completely inserted into the holder, the first lens array plate 24 and the second lens array plate 26 are secured to the holder 30 due to the engagement between the projection 80 and the recess 82.

The embodiment uses the above-mentioned securing method to secure the lens array plates to the holder. According to such a securing method, the lens array plate may be loose with respect to the holder, resulting in poor positioning precision. Thus, as shown in FIG. 2, it is preferable to provide a positioning pin 54 extending from the first surface part 30*a* through the second surface part 30*b*. The diameter of the hole for guiding the positioning pin 54 through is ensured to be equal to or slightly smaller than the diameter of the positioning pin 54. Thus, since the positioning pin 54 extends from the first surface part 30*a* through the second surface part 30*b* in a tightly fitted state, the relative position of the first and second lens array plates 24 and 26, and the first and second surface parts 30*a* and 30*b* is properly secured.

Figure 9:
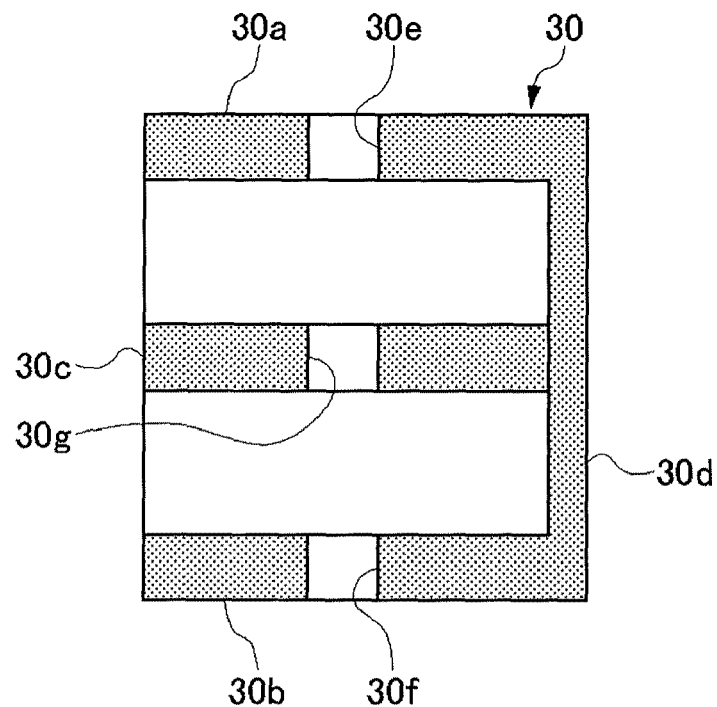
FIG. 9 shows a variation of the holder.

FIG. 9 shows a variation of the holder. In the holder 30 shown in FIG. 9, the first through holes 30*e*, the second through holes 30*f*, and the third through holes 30*g* are provided in the vicinity of the lateral center of the first surface part 30*a*, the second surface part 30*b*, and the third surface part 30*c*, respectively. Thus, the positions where the first through holes 30*e*, the second through holes 30*f*, and the third through holes 30*g* are non-restrictive.

Figure 10:
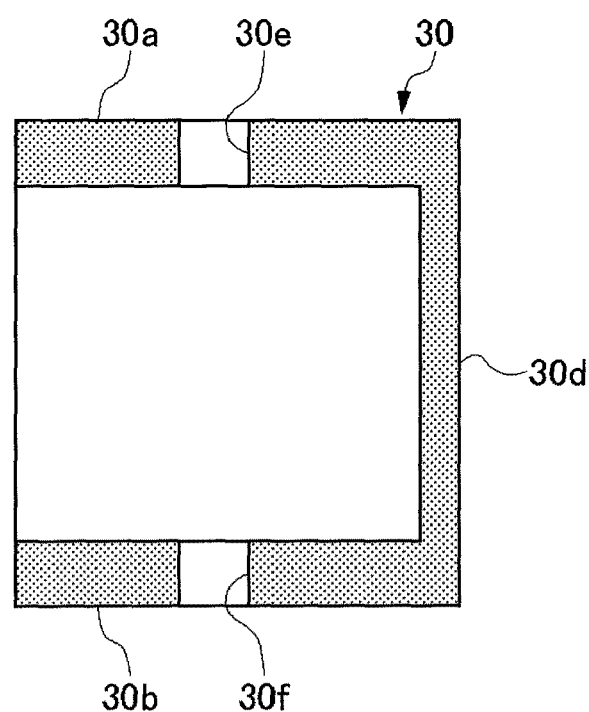
FIG. 10 shows another variation of the holder.

FIG. 10 shows another variation of the holder. In the holder 30 shown in FIG. 10, only the first surface part 30*a* and the second surface part 30*b* are supported by the support part 30*d*. The lens array unit can be formed by inserting a stack of the first lens array plate and the second lens array plate in the holder 30. In this case, the lens array unit having the imaging performance and stray light eliminating performance comparable to those of the lens array unit shown in FIGS. 2-4 can be produced by providing an extra light shielding member having a through hole between the first lens array plate and the second lens array plate.

Figure 11:
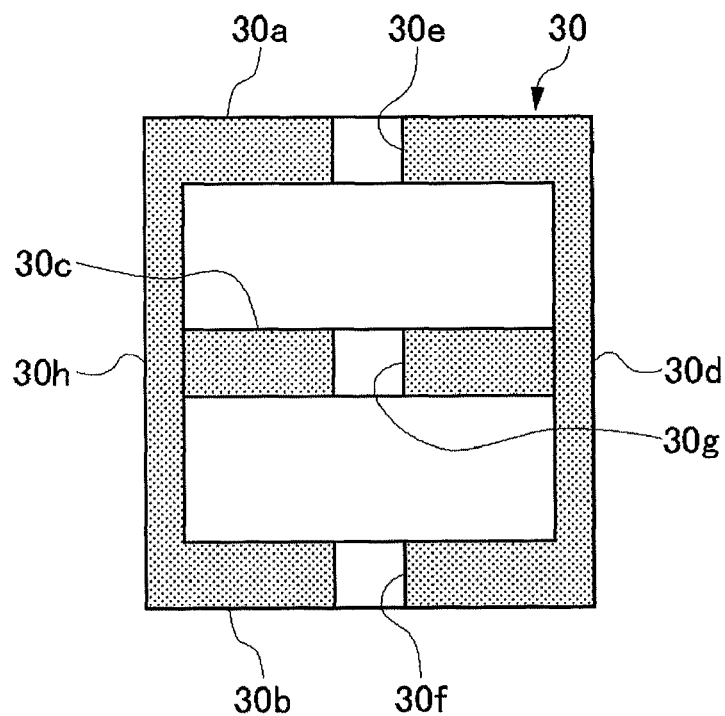
FIG. 11 shows another variation of the holder.

FIG. 11 shows another variation of the holder. In the holder 30 shown in FIG. 11, both lateral ends of each of the first surface part 30*a*, the second surface part 30*b*, and the third surface part 30*c* are supported by support parts 30*d* and 30*h*. Therefore, neither of the lateral ends of the holder 30 shown in FIG. 11 is open. In the holder 30 shown in FIG. 11, one or both of the longitudinal ends is open. The first lens array plate and the second lens array plate are inserted from the open end. In the holder 30 shown in FIG. 11, the entirety of the area surrounding the lenses of the lens array plates inserted into the holder 30 is covered by a light shielding member so that light is prevented from entering from outside. Since both lateral ends are supported by the support parts 30*d* and 30*h*, a structurally rigid lens array unit is produced.

Figure 12:
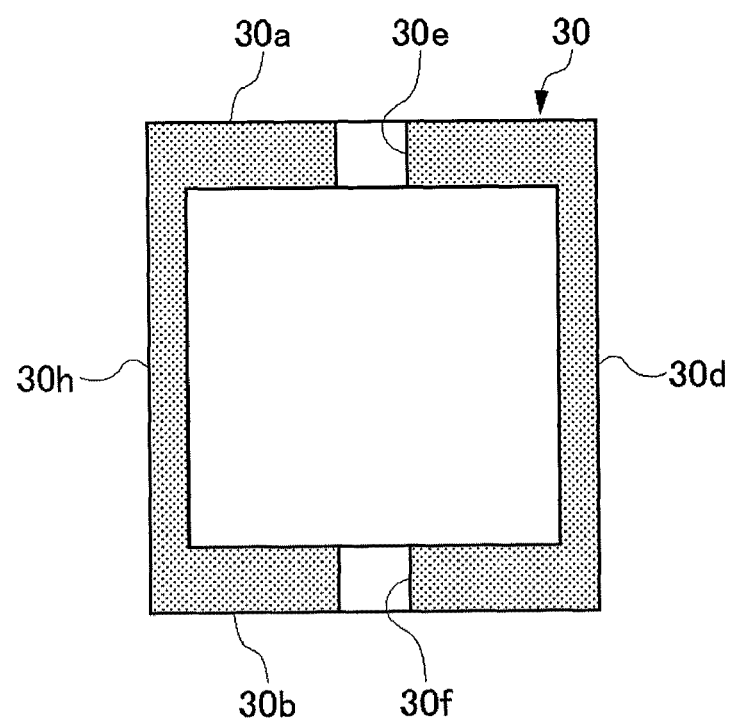
FIG. 12 shows another variation of the holder.

FIG. 12 shows another variation of the holder. In the holder 30 shown in FIG. 12, only the first surface part 30*a* and the second surface part 30*b* are supported by the support parts 30*d* and 30*h* at the respective lateral ends. In the holder 30 shown in FIG. 12, too, one or both of the longitudinal ends is open so that the first lens array plate and the second lens array plate are inserted from the open end. In this case, the lens array unit having the imaging performance and stray light eliminating performance comparable to those of the lens array unit having the holder shown in FIG. 11 can be produced by providing an extra light shielding member having a through hole between the first lens array plate and the second lens array plate.

Figure 13:
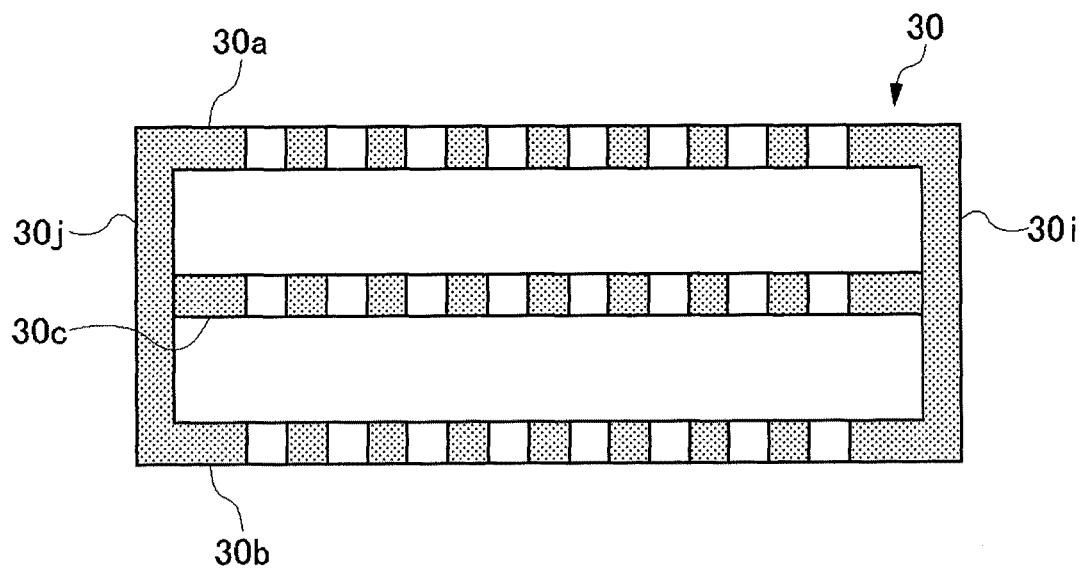
FIG. 13 shows another variation of the holder.

FIG. 13 shows another variation of the holder. In the holder 30 shown in FIG. 13, the first surface part 30*a*, the second surface part 30*b*, and the third surface part 30*c* are supported by support parts 30*i* and 30*j* at both longitudinal ends. In the holder 30 shown in FIG. 13, one or both of the lateral ends is open so that the first lens array plate and the second lens array plate are inserted from the open end. An inexpensive lens array unit having excellent imaging performance and stray light eliminating performance is produced by using the holder with the above structure.

Figure 14:
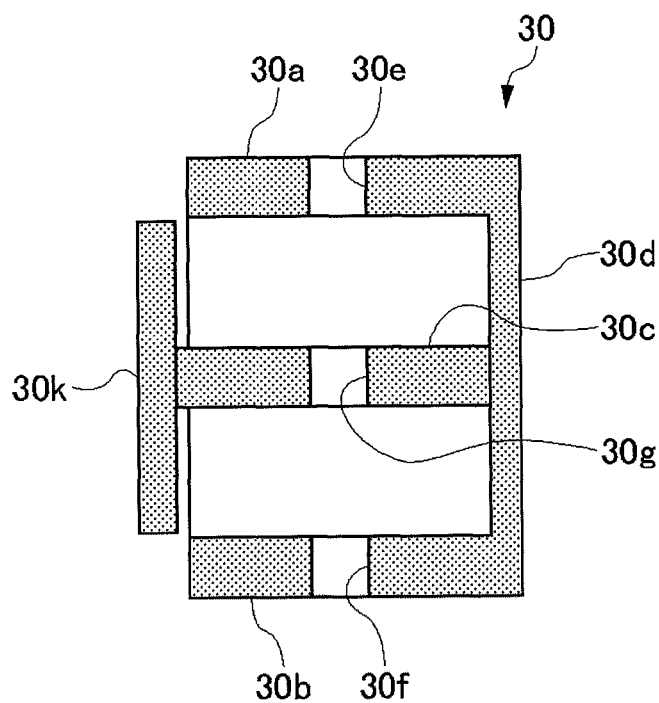
FIG. 14 shows another variation of the holder.

FIG. 14 shows another variation of the holder. In the holder 30 shown in FIG. 14, the lateral open end of the holder 30 described with reference to FIGS. 2-4 is provided with a light shielding plate 30*k* for shielding light entering the open end. In the holder 30 shown in FIG. 14, the shielding plate 30*k* extends from the open lateral end of the third surface part 30*c* toward the first surface part 30*a* and the second surface part 30*b*. The light shielding plate 30*k* may be integrated with the first surface part 30*a* and the second surface part 30*b*. Alternatively, the plate 30*k* may be attached to the parts as a separate component. When fitting the first lens array plate and the second lens array plate to the holder 30, the light shielding plate 30*k* is bent outward to open one of the ends of the holder 30, before inserting the first lens array plate and the second lens array plate. According to the holder 30 shown in FIG. 14, light not contributing to imaging is prevented from entering the open lateral end.

Figure 15:
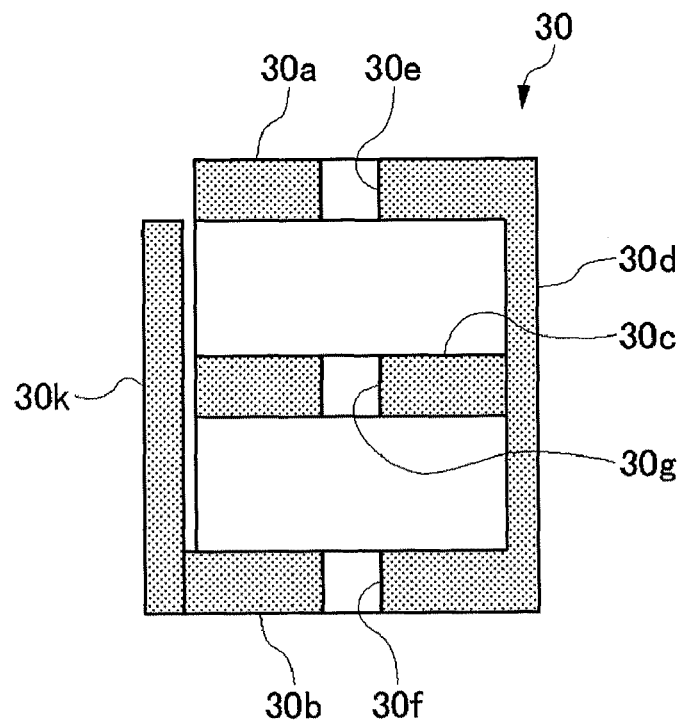
FIG. 15 shows another variation of the holder.

FIG. 15 shows another variation of the holder. The holder 30 shown in FIG. 15 is different from that of FIG. 14 in the position of fitting the light shielding plate 30*k* and in the shape thereof. In the holder 30 shown in FIG. 15, the light shielding plate 30*k* extends from the open lateral end of the second surface 30*b* to the neighborhood of the first surface part 30*a*. The light shielding plate 30*k* may be integrated with the first surface part 30*a* and the second surface part 30*b*. Alternatively, the plate 30*k* may be attached to the parts as a separate component. When fitting the first lens array plate and the second lens array plate to the holder 30, the light shielding plate 30k is bent outward to open one of the ends of the holder 30, before inserting the first lens array plate and the second lens array plate. According to the holder 30 shown in FIG. 15, light not contributing to imaging is prevented from entering the open lateral end.

Figure 16:
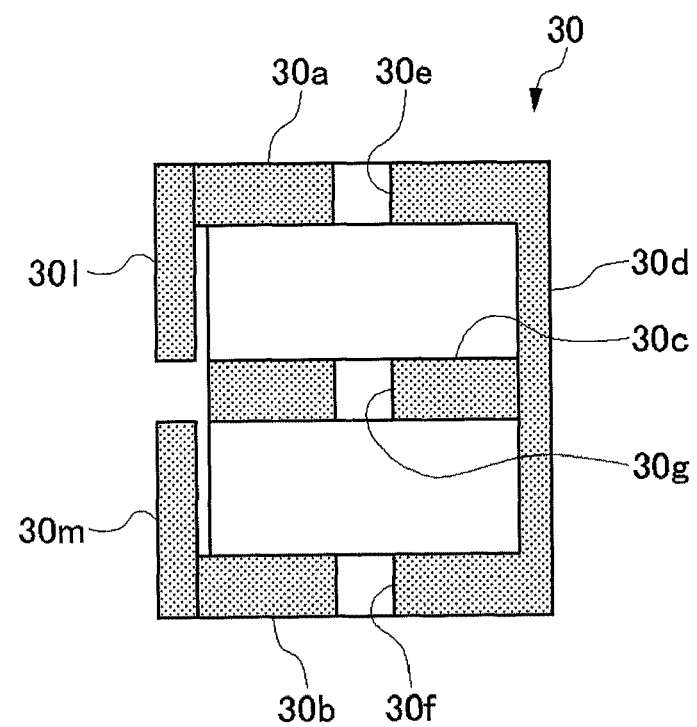
FIG. 16 shows another variation of the holder.

FIG. 16 shows another variation of the holder. In the holder 30 shown in FIG. 16, two plates including a first light shielding plate 30l and a second light shielding plate 30m are used. The first light shielding plate 30l extends from the open lateral end of the first surface part 30a to the neighborhood of the third surface part 30c. The second light shielding plate 30m extends from the open lateral end of the second surface part 30b to the neighborhood of the third surface part 30c. The first light shielding plate 30l and the second light shielding plate 30m may be integrated with the first surface part 30a and the second surface part 30b. Alternatively, the plates may be attached to the parts as separate components. When fitting the first lens array plate and the second lens array plate to the holder 30, the first light shielding plate 30l and the second light shielding plate 30m are bent outward to open one of the ends of the holder 30, before inserting the first lens array plate and the second lens array plate. According to the holder 30 shown in FIG. 16, light not contributing to imaging is prevented from entering the open lateral end.

Figure 17:
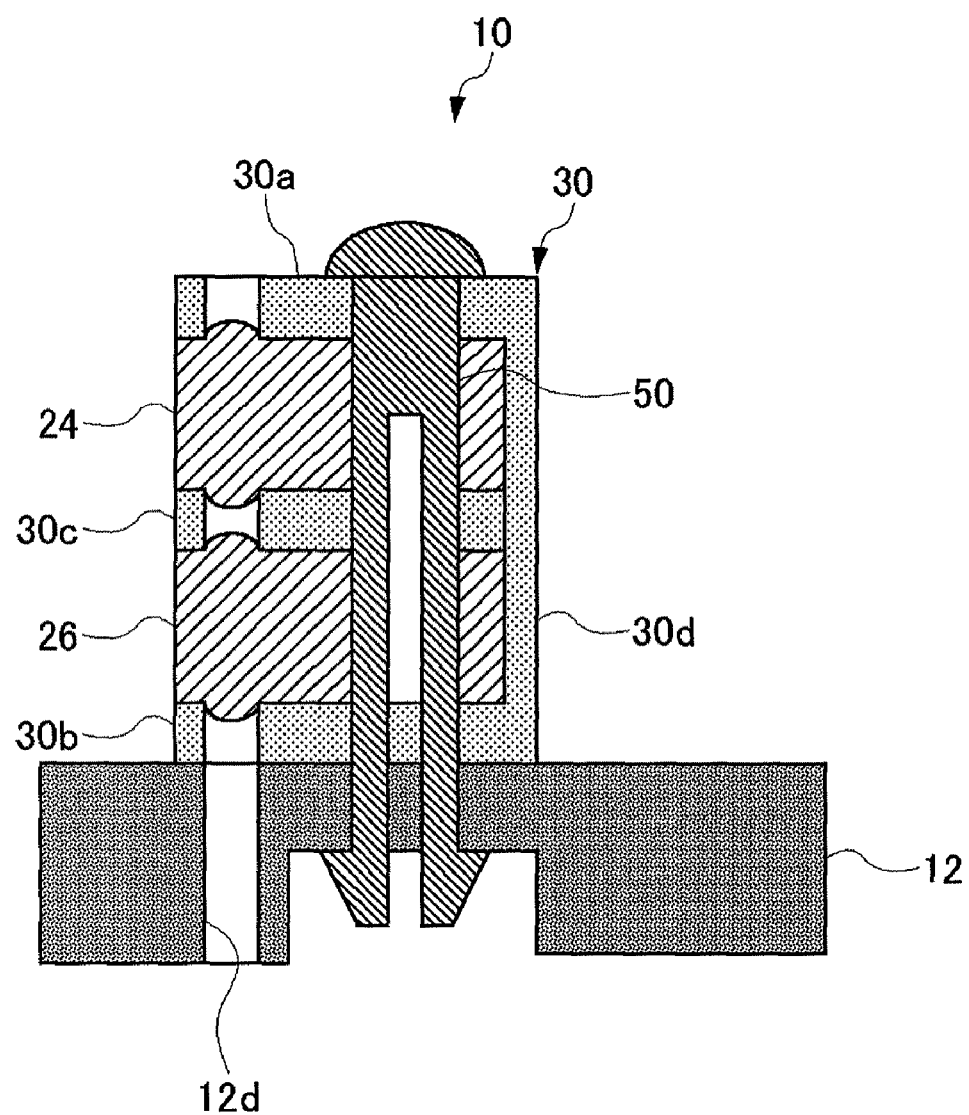
FIG. 17 shows another method of securing the lens array unit.

FIG. 17 shows another method of securing the lens array unit 10. In the embodiment shown in FIG. 17, the first lens array plate 24 and the second lens array plate 26 are secured to the holder 30, and the lens array unit 10 is secured to the frame 12, by running a caulking pin 50 from the first surface part 30a through the frame 12. The frame 12 is formed with a plurality of through holes 12d corresponding to the lenses of the lens array unit 10 and the through holes. By configuring the lens array unit as described above, the number of components for securing the lens array unit 10 is reduced, and the number of manufacturing steps is reduced, making the image reading device inexpensive.

Figure 18:
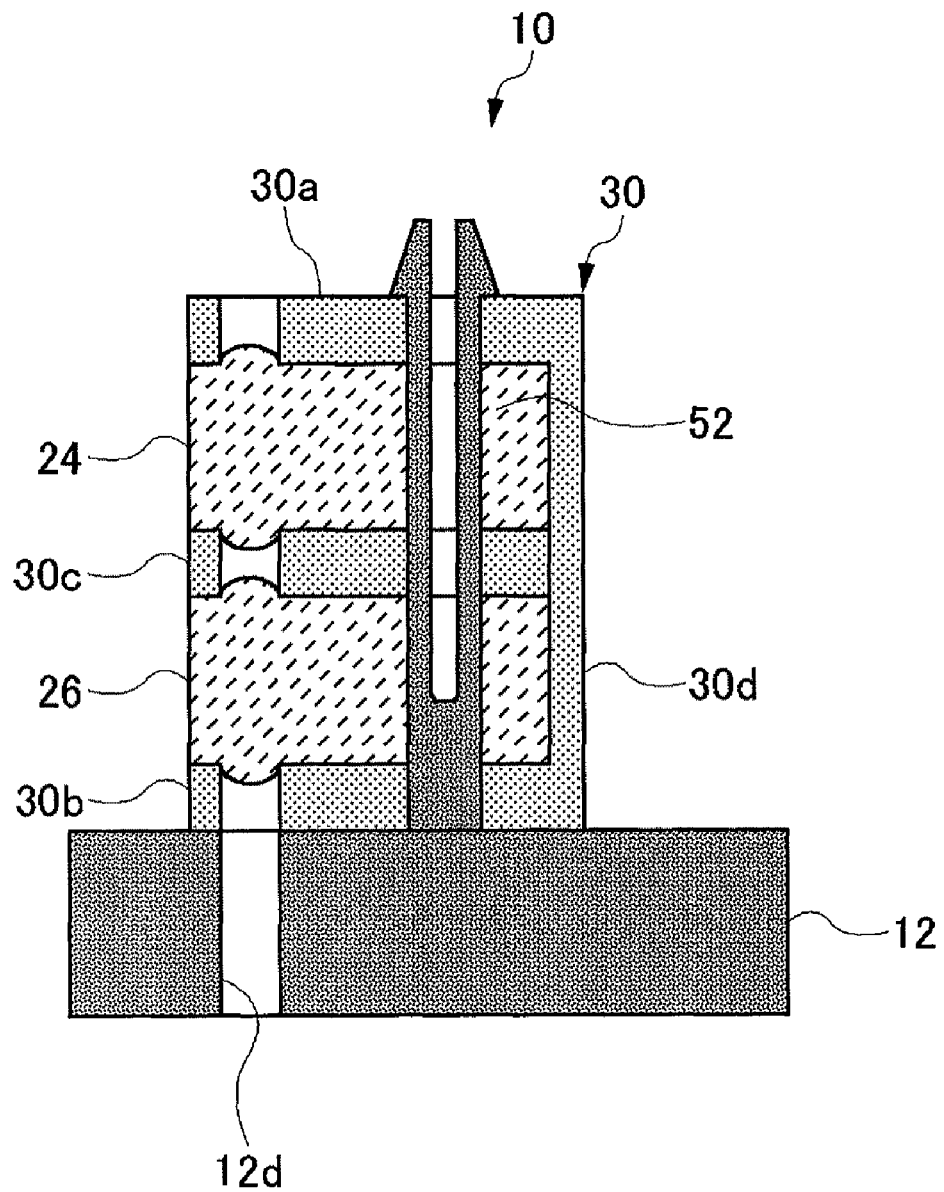
FIG. 18 shows another method of securing the lens array unit.

FIG. 18 shows another method of securing the lens array unit 10. In the embodiment shown in FIG. 18, a caulking pin 52 is made to stand on the frame 12. The first lens array plate 24 and the second lens array plate 26 are secured to the holder 30, and the lens array unit 10 is secured to the frame 12, by running the caulking pin 52 from the second surface part 30b through the first surface part 30a. By integrating the caulking pin 52 with the frame 12, the number of components for securing is further reduced as compared to the embodiment shown in FIG. 17, making the image reading device inexpensive.

Figure 19:
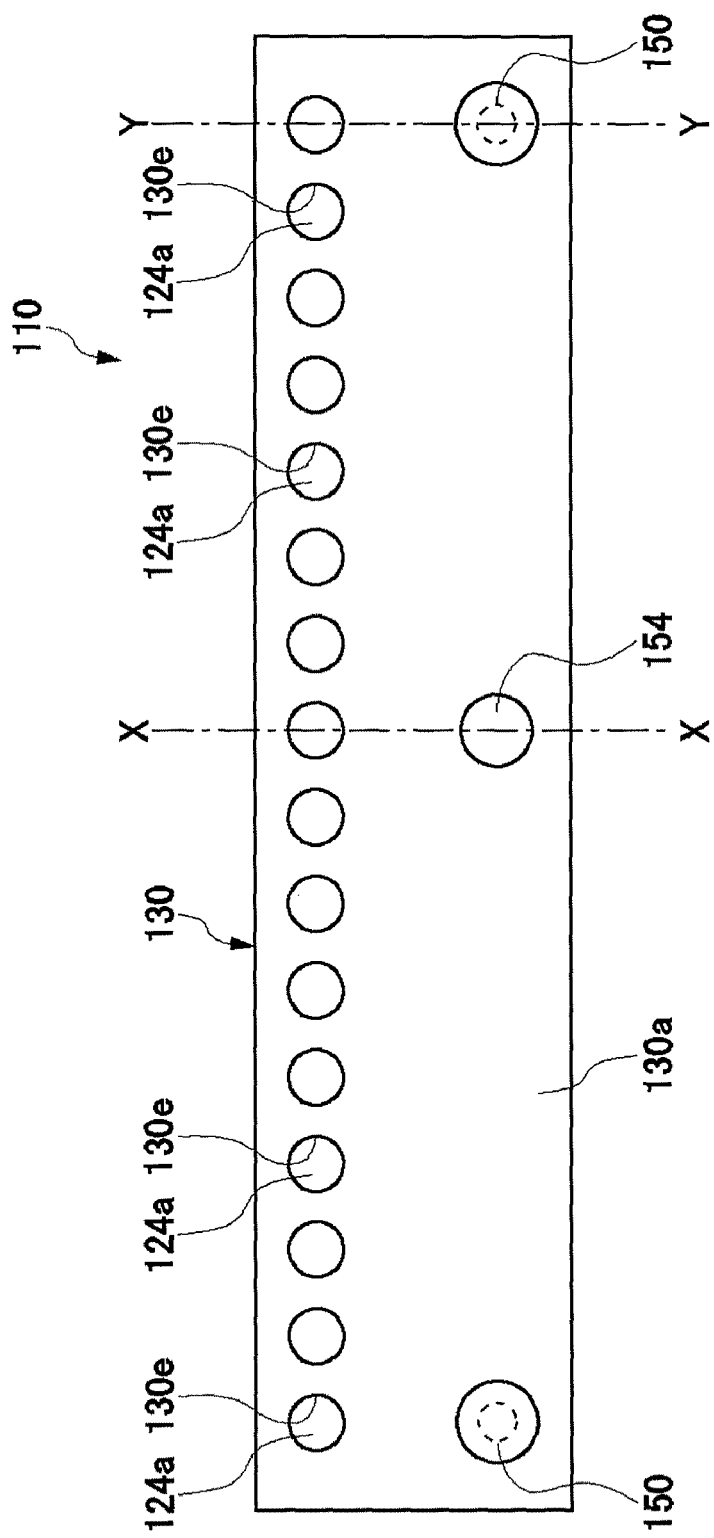
FIG. 19 is a top view of the lens array unit according to another embodiment of the present invention.

FIG. 19 is a top view of the lens array unit 110 according to another embodiment of the present invention. The lens array unit 110 is can also be mounted on the image reading device 100 shown in FIG. 1. FIG. 19 shows the lens array unit 110 as viewed from the document G.

Figure 20:
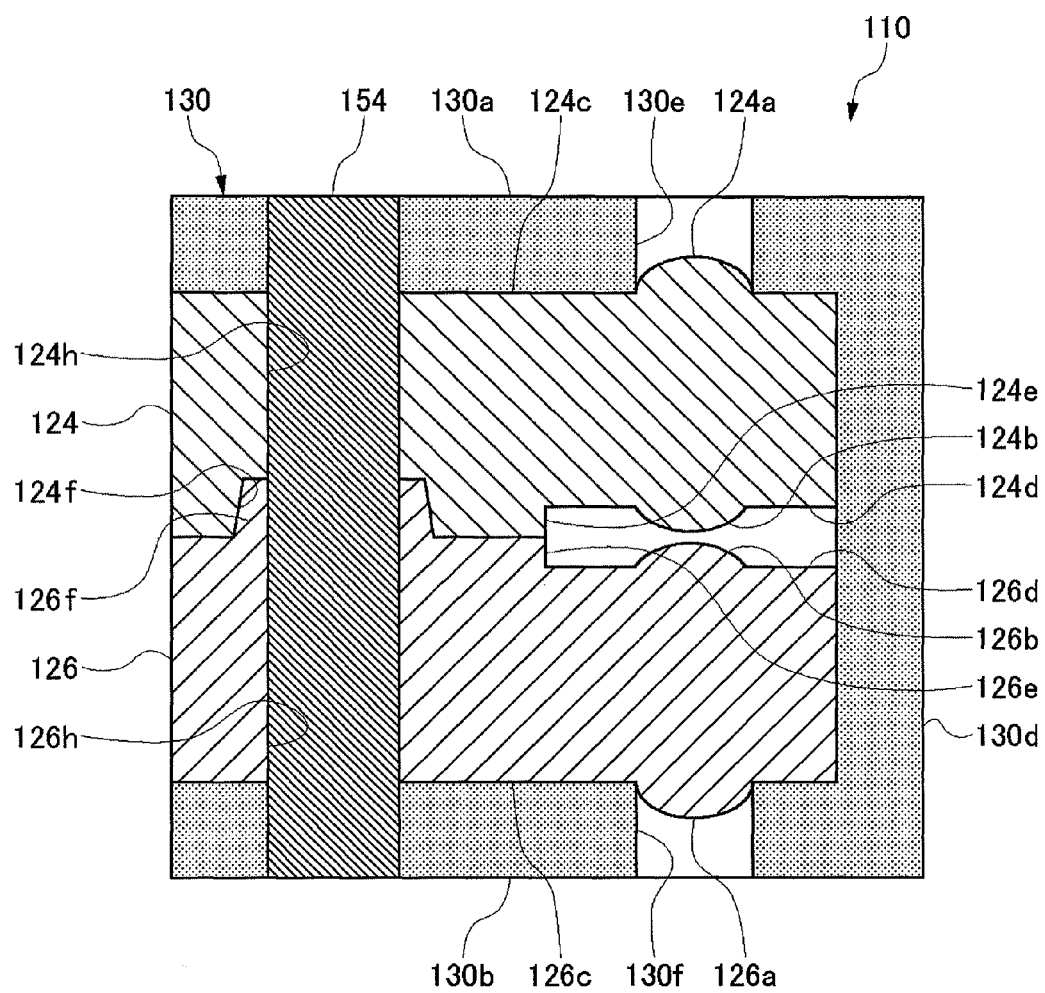
FIG. 20 is an X-X sectional view of the lens array unit shown in FIG. 19.
Figure 21:
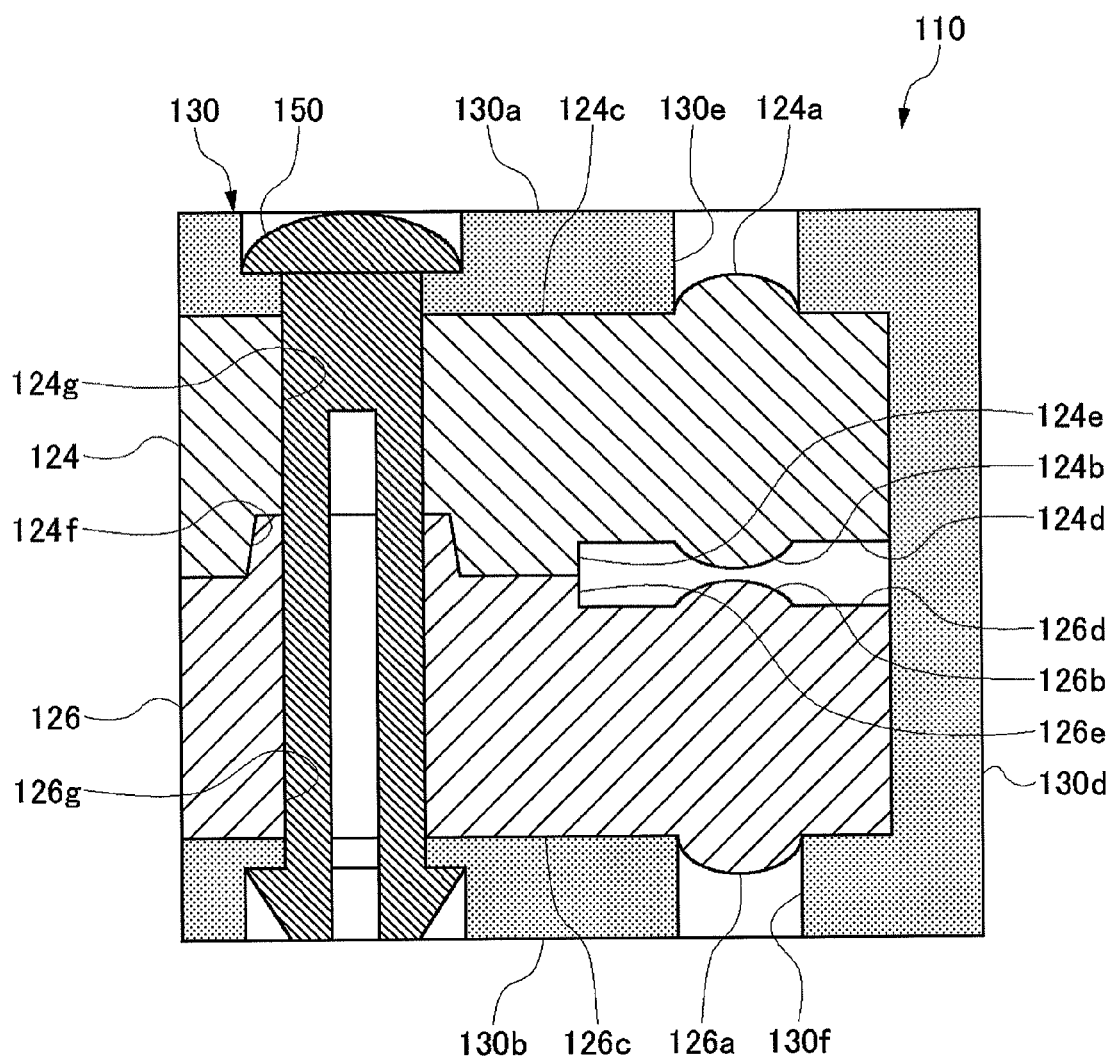
FIG. 21 is a Y-Y sectional view of the lens array unit shown in FIG. 19.

FIG. 20 is an X-X sectional view of the lens array unit 110 shown in FIG. 19. FIG. 21 is a Y-Y sectional view of the lens array unit 110 shown in FIG. 19.

As shown in FIGS. 19-21, the lens array unit 110 is provided with a first lens array plate 124, a second lens array plate 126, and a holder 130.

The first lens array plate 124 and the second lens array plate 126 are rectangular in shape. A plurality of convex lenses are arranged on both surfaces of the plate. In other words, a plurality of first outer lenses 124a are systematically arranged on a first outer side surface 124c of the first lens array plate 124, and a plurality of first inner lenses 124b are systematically arranged on a first inner side surface 124d. A plurality of second outer lenses 126a are systematically arranged on a second outer side surface 126c of the second lens array plate 126, and a plurality of second inner lenses 126b are systematically arranged on a second inner side surface 126d.

According to the embodiment, the first outer lens 124a, the first inner lens 124b, the second outer lens 126a, and the second inner lens 126b have the same shape. The lenses are arranged in a line at the same pitch in the longitudinal direction of the lens array plate. Thus, when the first lens array plate 124 and the second lens array plate 126 are placed such that the first inner lenses 124b and the second inner lenses 126b are opposite to each other, the optical axes of the corresponding four lenses are aligned. According to the embodiment, it is assumed that the first outer lens 124a, the first inner lens 124b, the second outer lens 126a, and the second inner lens 126b are spherical in shape. Alternatively, the lenses may have aspherical shapes.

The first lens array plate 124 and the second lens array plate 126 are formed by injection molding. Preferably, each of the first lens array plate 124 and the second lens array plate 126 is formed of a material amenable to injection molding, having high light transmittance in a required wavelength range, and having low water absorption. Desired materials include cycloolefin resins, olefin resins, norbornene resins, and polycarbonate.

The holder 130 supports a stack of the first lens array plate 124 and the second lens array plate 126 such that the first inner lenses 124b and the second inner lenses 126b are opposite to each other. As in the holder 30 shown in FIG. 10, only the first surface part 130a and the second surface part 130b are supported by the support part 130d.

The first surface part 130a and the second surface part 130b are rectangular plate members having substantially the same size. The first surface part 130a and the second surface part 130b are supported by the support 130d provided at the right end of the surface parts in the lateral direction such that the surface parts are parallel and create a predetermined space therebetween. In the holder 130, the space between the first surface part 130a and the second surface part 130b is ensured to be equal to or slightly larger than a sum of the thicknesses of the first lens array plate 124 and the second lens array plate 126 so that the first lens array plate 124 and the second lens array plate 126 can be inserted into the space.

A plurality of first through holes 130e corresponding to the plurality of first outer lenses 124a of the first lens array plate 124 are formed in the first surface part 130a. A plurality of second through holes 130f corresponding to the plurality of second outer lenses 126a of the second lens array plate 126 are formed in the second surface part 130b. The first through holes 130e and the second through holes 130f are cylindrical in shape.

According to the embodiment, the first through holes 130e and the second through holes 130f have the same shape and are arranged in a line at the same pitch in the longitudinal direction of the first surface part 130a and the second surface part 130b, respectively. The central axes of the corresponding two through holes are aligned. The diameter of each of the first through holes 130e and the second through holes 130f is substantially the same as the diameter of the effective region of each of the first outer lenses 124a and the second outer lenses 126a. The term "effective region of a lens" refers to a portion having the function of a lens. The pitch of arrangement of the first through holes 130e and the second through holes 130f is identical to the pitch of arrangement of the first outer lenses 124a and the second outer lenses 126a.

The first surface part 130a, the second surface part 130b, and the support part 130d are integrally formed by a light shielding material. The assembly may be formed by, for example, injection molding. Preferably, the shielding material is amenable to injection molding and is highly capable of shielding light in a desired wavelength band. For example, the shielding material may be an ABS resin.

The first lens array plate 124 and the second lens array plate 126 are held in the holder 130 by being inserted into the space between the first surface part 130a and the second surface part 130b from the open left end in the lateral direction. In a state where the first lens array plate 124 is inserted in the holder 130, the plurality of first outer lenses 124a are set in the respective first through holes 130e of the first surface part 130a. Further, in a state where the second lens array plate 126 is inserted in the holder 130, the plurality of second outer lenses 126a are set in the respective second through holes 130f of the second surface part 130b.

By producing the assembly as described above, the area on the first outer side surface 124c of the first lens array plate 124 outside the effective region of the first outer lenses 124a is covered by the first surface part 130a. Further, the area on the second outer side surface 126c of the second lens array plate 126 outside the effective region of the second outer lenses 126a is covered by the second surface part 130b.

As described above, the first surface part 130a and the second surface part 130b are formed of a light shielding material. Therefore, the first surface part 130a functions as a light shielding member for preventing light not contributing to imaging (hereinafter, referred to as stray light) from being incident on the first outer lenses 124a. The second surface part 130b functions as a light shielding member for preventing stray light from exiting the second outer lenses 126a.

As shown in FIG. 21, the first lens array plate 124 and the second lens array plate 126 are secured to the holder 130 by a caulking pin 150, which is a securing pin member extending from the first surface part 130a of the holder 130 through the second surface part 130b. As shown in FIG. 19, the caulking pin 150 is provided at both longitudinal ends of the lens array unit 110.

Further, as shown in FIG. 20, a positioning pin 154 extending from the first surface part 130a through the second surface part 130b is provided substantially at the longitudinal center of the lens array unit 110. The diameter of the hole for guiding the positioning pin 154 through is ensured to be equal to or slightly smaller than the diameter of the positioning pin 154. The hole is formed in the first lens array plate 124, the second lens array plate 126, and the holder 130. Thus, since the positioning pin 154 extends from the first surface part 130a through the second surface part 130b in a tightly fitted state, the relative position of the first and second lens array plates 124 and 126, and the first and second surface parts 130a and 130b is properly secured.

In the lens array unit 110 according to the embodiment, a recess 124f provided with a first step part 124e is provided in the first inner side surface 124d of the first lens array plate 124. Further, a projection 126f provided with a second step part 126e is provided in the second inner side surface 126d of the second lens array plate 126. The recess 124f and the projection 126f are formed so as to be engaged with each other and form a provisional positioning part for provisionally positioning the first lens array plate 124 and the second lens array plate 126 before inserting the plates in the holder 130. In this embodiment, the recess 124f is provided in the first inner side surface 124d and the projection 126f is provided in the second inner side surface 126d. Conversely, the first inner side surface may be provided with a projection and the second inner side surface may be provided with a recess.

The first step part 124e of the first lens array plate 124 is contact with the second step part 126e of the second lens array plate 126. This defines the space between the first inner lens 124b and the second inner lens 126b so as to achieve a predetermined optical property.

According to this embodiment, the recess 124f and the projection 126f are formed around a first caulking pin insertion hole 124g of the first lens array plate 124 and a second caulking pin insertion hole 126g of the second lens array plate 126. The caulking pin 150 is inserted in the first caulking pin insertion hole 124g and the second caulking pin insertion hole 126g. The recess 124f and the projection 126f are also formed around a first positioning pin insertion hole 124h of the first lens array plate 124 and a second positioning pin insertion hole 126h of the second lens array plate 126. The positioning pin 154 is inserted in the first positioning pin insertion hole 124h and the second positioning pin insertion hole 126h. By forming the recess 124f and the projection 126f around the caulking pin insertion hole and the positioning pin insertion hole, the precision of positioning the lenses and the through holes is improved.

Figure 22:
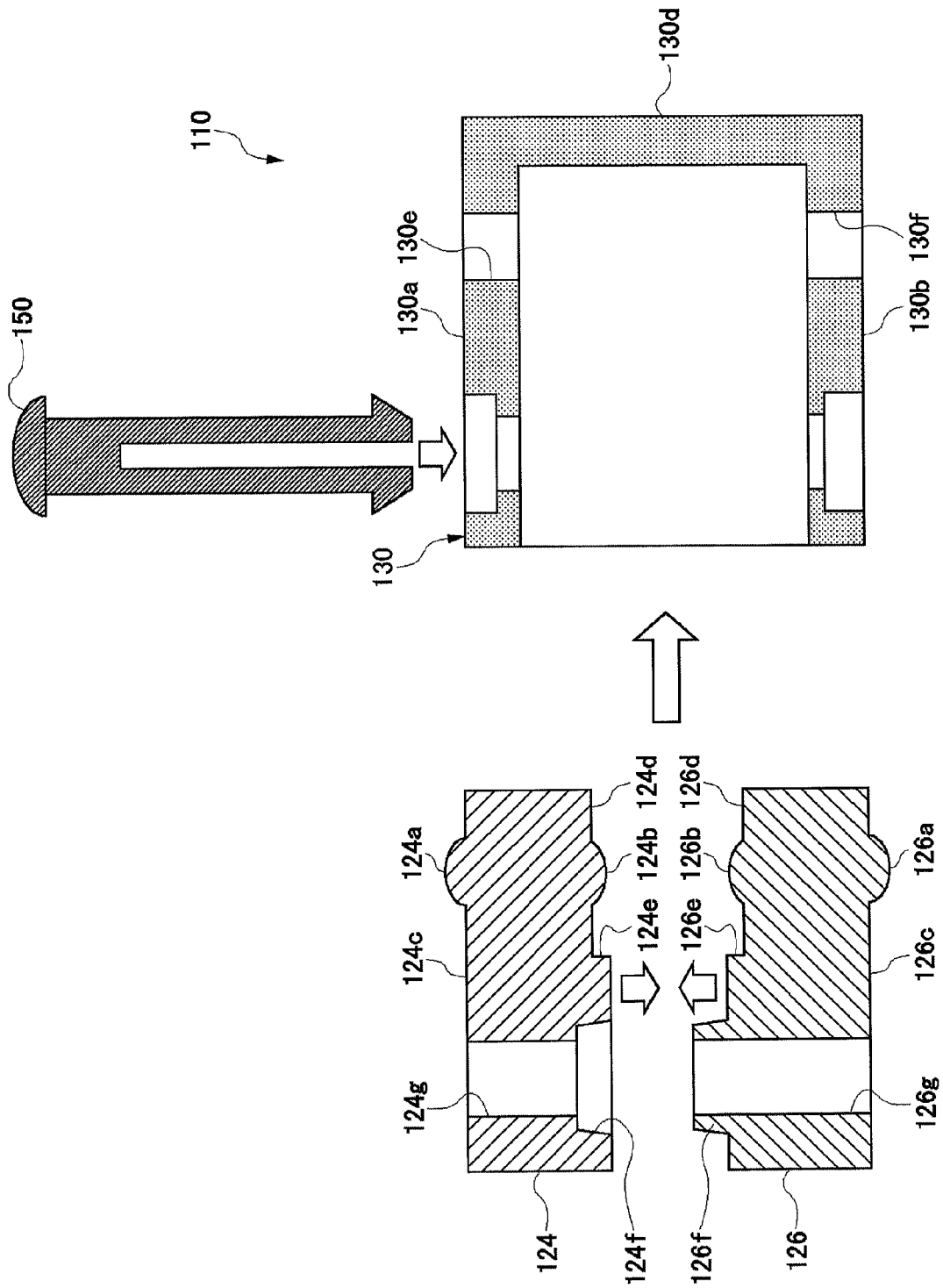
FIG. 22 shows how the lens array unit is assembled.
Figure 23:
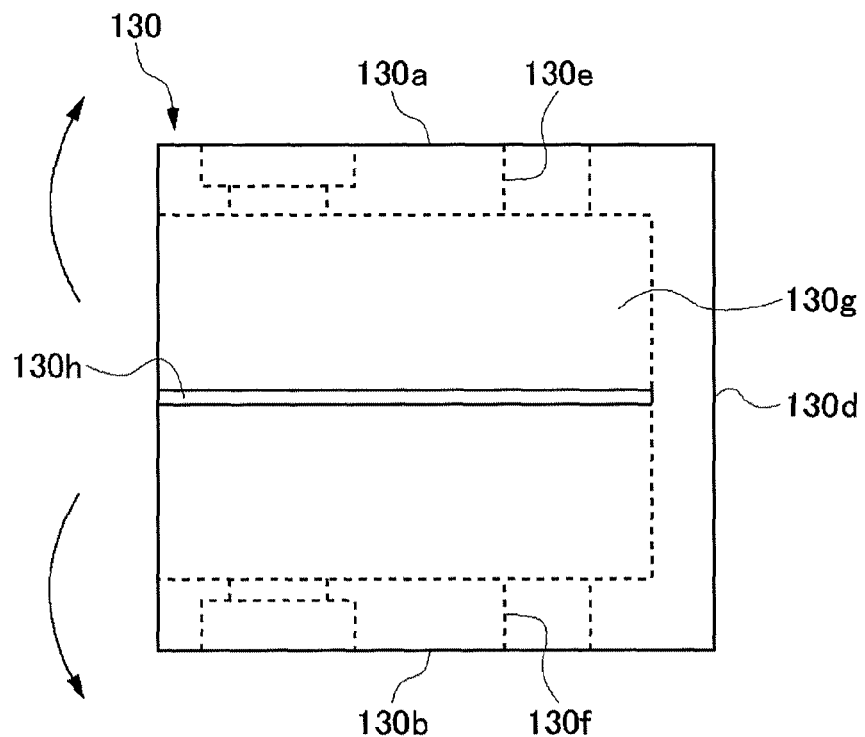
FIG. 23 is a side view of the holder.

FIG. 22 shows how the lens array unit 110 is assembled. FIG. 23 is a side view of the holder 30.

In assembling the lens array unit 110, the first lens array plate 124 and the second lens array plate 126 are stacked such that the first inner lenses 124b and the second inner lenses 126b are opposite to each other. By engaging the recess 124f of the first lens array plate 124 with the projection 126f of the second lens array plate 126, the first lens array plate 124 and the second lens array plate 126 are provisionally positioned.

A stack of the first lens array plate 124 and the second lens array plate 126 is inserted into the space between the first surface part 130a and the second surface part 130b from the open left end of the holder 130 in the lateral direction. The plates are inserted while extending the open lateral ends of the first surface part 130a and the second surface part 130b. In this embodiment, a slit 130h extending from the open lateral end to the support part 130d is provided in each lateral wall surface part 130g of the holder 130 in the longitudinal direction. The slit 130h facilitates the extension of the first surface part 130a and the second surface part 130b, thereby improving the ease of assembly.

Subsequently, the caulking pin 150 is inserted so as to secure the first lens array plate 124 and the second lens array plate 126 to the holder 130. The relative position of the first and second lens array plates 124 and 126, and the first and second surface parts 130a and 130b is properly secured, by inserting the positioning pin 154 at the end of the process.

Unlike the case of the lens array unit 10 shown in FIG. 3, the holder 130 of this embodiment does not have a third surface part between the first surface part 130a and the second surface part 130b. Therefore, it will be difficult to align the first lens array plate 124 and the second lens array plate 126 with each other if the first lens array plate 124 and the second lens array plate 126 are inserted separately. Thus, the lens array unit 110 of this embodiment is configured such that the first lens array plate 124 and the second lens array plate 126 are provisionally positioned by engaging the recess 124f with the projection 126f, before inserting the plates in the holder 130. This improves the ease of assembly of the lens array unit 110. Accordingly, the number of steps of assembly is reduced, making the lens array unit 110 inexpensive.

By not providing a third surface part in the holder 130, the structure of the holder 130 is simplified, making the lens array unit 110 inexpensive.

Since the holder 130 according to this embodiment also functions as a light shielding member for eliminating stray light entering the lenses, the number of components is reduced, making the lens array unit 110 inexpensive. Since the first surface part 130a, the second surface part 130b, and the support part 130d of the holder 130 are formed as one piece, the first through holes 130e and the second through holes 130f are formed at predetermined positions with high precision. This improves the precision of positioning the lenses and the through holes and improves the imaging performance as a result.

Figure 24:
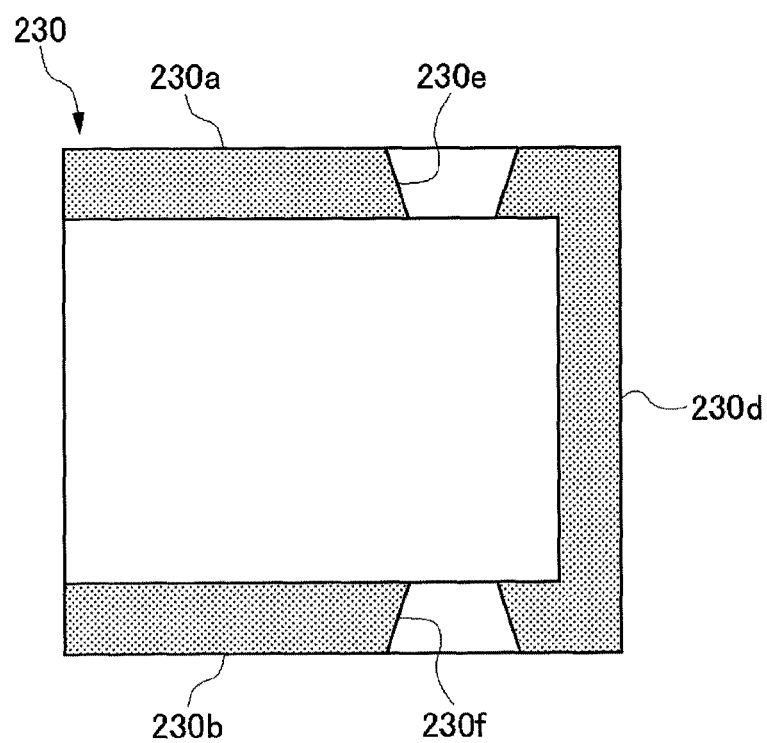
FIG. 24 shows a variation of the holder.

FIG. 24 shows another variation of the holder. In the holder 230 shown in FIG. 24, a first surface part 230a and a second surface part 230b are supported by a support part 230d so as to be displaced at a predetermined distance from each other. In this holder 230, a first through hole 230e and a second through hole 230f are formed as tapered holes. By forming the first through hole 230e and the second through hole 230f are tapered holes, stray light entering the lenses of the first lens array plate and the second lens array plate is reduced. FIG. 24 shows that the first through hole 230e and the second through hole 230f are formed as tapered holes having a diameter progressively smaller towards the interior of the holder 130. Alternatively the holes may formed as tapered holes having a diameter progressively larger toward the interior. In the holder 230 shown in FIG. 24, both the first through hole 230e and the second through hole 230f are formed as tapered holes. Alternatively, only one of the holes may be formed as a tapered hole.

FIG. 25 shows another variation of the holder. In the holder 330 shown in FIG. 25, a first surface part 330a and a second surface part 330b are supported by a support part 330d so as to be displaced at a predetermined distance from each other. In this holder 330, irregularities 330g are formed on the inner surfaces of the first through hole 330e and the second through hole 330f. By forming the irregularities 330g, light incident on the inner surfaces of the first through hole 330e and the second through hole 330f is scattered by the irregularities 330g so that the light reflected by the inner surfaces of the first through hole 330e and the second through hole 330f is prevented from turning into stray light. The irregularities may be formed by using a mold when forming the first through hole 330e and the second through hole 330f by injection molding. Alternatively, the irregularities may be formed by roughening the inner surfaces of the first through hole 330e and the second through hole 330f after forming the holes. While both inner surfaces of each of the first through hole 330e and the second through hole 330f are formed with the irregularities 330g in the holder 330 shown in FIG. 25, only one of the inner surfaces may be formed with irregularities.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiments described, two lens array plates are stacked to form a lens array unit for forming an erect equal-magnification image. The number of lens array plates stacked is not limited to two. For example, an additional lens array plate may be inserted between the first lens array plate and the second lens array plate so as to form a lens array unit. In the embodiments, a lens array plate wherein lenses are formed on both surfaces thereof is used. Alternatively, a plurality of lens array plates each formed with lenses on only one surface thereof may be stacked to form a lens array unit.

In the embodiments described, the lenses and the through holes are each arranged in a line. The pattern of arranging the lenses or holes is not non-limiting. For example, the lenses and the through holes may be arranged in a plurality of lines.

In the embodiments described, the lens of the lens array plate are set in the corresponding through hole of the holder. The lens may not be necessarily set in the through hole and may be located opposite to the corresponding through hole. The location of the lens opposite to the through hole is defined as a location where the optical axis of the lens is aligned with the central axis of the through hole.

What is claimed is:

1. A lens array unit comprising:
a first lens array plate provided with a plurality of first outer lenses arranged systematically on one of the surfaces of the plate and with a plurality of first inner lenses arranged systematically on the other surface;
a second lens array plate provided with a plurality of second outer lenses arranged systematically on one of the surfaces of the plate and with a plurality of second inner lenses arranged systematically on the other surface; and
a holder operative to hold a stack of the first lens array plate and the second lens array plate such that the first inner lenses and the second inner lenses are respectively opposite to each other, wherein
the holder comprises:
a first surface part provided with a plurality of first through holes respectively corresponding to the plurality of first outer lenses;
a second surface part provided with a plurality of second through holes respectively corresponding to the plurality of second outer lenses; and
a support part operative to support the first surface part and the second surface part so as to be located at a predetermined distance from each other, wherein
the first surface part, the second surface part, and the support part are integrally formed by a light shielding material, and
the first lens array plate and the second lens array plate are held by the holder by being inserted between the first surface part and the second surface part such that each of the plurality of first outer lenses is located opposite to the corresponding first through hole, and each of the plurality of second outer lenses is located opposite to the corresponding second through hole.

2. The lens array unit according to claim 1, wherein
a third surface part, formed by a light shielding material and formed with a plurality of third through holes respectively corresponding to the first inner lenses and the second inner lenses, is provided between the first lens array plate and the second lens array plate.

3. The lens array unit according to claim 2, wherein
the third surface part is formed to be integral with the first surface part, the second surface part, and the support part.

4. The lens array unit according to claim 1, wherein
the support part supports the first surface part and the second surface part at one of the ends of each in the lateral direction, and the first and second lens array plates are held by the holder by being inserted into the space between the first surface part and the second surface part from the other, open end in the lateral direction.

5. The lens array unit according to claim 4, wherein the through holes of the first surface part and the second surface part are provided more toward the open end than the center in the lateral direction.

6. The lens array unit according to claim 4, wherein
the holder is provided, at the open end in the lateral direction, with a light shielding plate for shielding light entering from the open end.

7. The lens array unit according to claim 1, wherein the first and second lens array plates are secured to the holder by a securing pin member extending from the first surface part through the second surface part.

8. The lens array unit according to claim 7, wherein the pin member has a pin head projecting from the first surface part by a predetermined height.

9. The lens array unit according to claim 1, wherein the first and second lens array plates are secured to the holder by an engagement structure.

10. The lens array unit according to claim 1, further comprising a positioning pin member extending from the first surface part through the second surface part, wherein the positioning pin member is operative to secure the relative position of the first and second lens array plates, and the first and second surface parts.

11. The lens array unit according to claim 1, wherein the first and/or second array plate has a tapered portion at the leading end inserted into the space between the first surface part and the second surface part.

12. The lens array unit according to claim 1, wherein the other surface of the first lens array plate and the other surface of the second lens array plate are provided with a provisional positioning part comprising a recess and a projection for convex-concave engagement.

13. The lens array unit according to claim 12, wherein the first and second lens array plates are each formed with a positioning pin member insertion hole in which is inserted a positioning pin member for securing the relative position of the first and second lens array plates, and the first and second surface parts, and/or with a securing pin member insertion hole in which is inserted a securing pin member for securing the first and second lens array plates to the holder, and wherein the recess and the projection are formed around the positioning pin member insertion hole and/or the securing pin member insertion hole.

14. The lens array unit according to claim 1, wherein the holder has a lateral wall surface part at both ends thereof in the longitudinal direction, and a slit for extending the space between the first surface part and the second surface part is provided in the lateral wall surface part.

15. The lens array unit according to claim 1, wherein irregularities are formed on the inner surface of the first through hole and/or the second through hole.

16. The lens array unit according to claim 1, wherein the first through hole and/or the second-through hole is formed as tapered hole.

17. An image reading device comprising:
a line irradiator device for irradiating a document;
a the lens array unit according to claim 1 for condensing light exiting the line irradiator device and reflected from the document; and
a line image sensor for receiving the light condensed by the lens array unit.

* * * * *